(12) United States Patent
Klapman et al.

(10) Patent No.: US 12,267,775 B2
(45) Date of Patent: Apr. 1, 2025

(54) WIRELESS DEVICE LOSS PREVENTION AND DISCOVERY

(71) Applicant: Western Digital Technologies, Inc., San Jose, CA (US)

(72) Inventors: Matthew Harris Klapman, San Jose, CA (US); David Ross, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 436 days.

(21) Appl. No.: 17/852,290

(22) Filed: Jun. 28, 2022

(65) Prior Publication Data

US 2023/0422169 A1 Dec. 28, 2023

(51) Int. Cl.
*H04W 52/02* (2009.01)
*H04W 4/02* (2018.01)
*H04W 8/00* (2009.01)

(52) U.S. Cl.
CPC ....... *H04W 52/0216* (2013.01); *H04W 4/023* (2013.01); *H04W 8/005* (2013.01); *H02J 2300/22* (2020.01)

(58) Field of Classification Search
CPC . H04W 52/0216; H04W 4/023; H04W 8/005; H02J 2300/22
USPC ........................................................ 455/517
See application file for complete search history.

(56) References Cited

U.S. PATENT DOCUMENTS

| | | |
|---|---|---|
| 9,736,870 B1 | 8/2017 | Dunsbergen et al. |
| 2010/0332858 A1 | 12/2010 | Trantham et al. |
| 2013/0235780 A1 | 9/2013 | Kim et al. |
| 2014/0088776 A1 | 3/2014 | Brandt et al. |
| 2014/0317350 A1 | 10/2014 | Langas et al. |
| 2016/0235236 A1* | 8/2016 | Byers ..................... A47G 29/14 |
| 2018/0167894 A1 | 6/2018 | Braxton |
| 2018/0317041 A1 | 11/2018 | Angelini et al. |
| 2021/0274315 A1* | 9/2021 | Daoura ................... H04W 4/38 |
| 2021/0334221 A1 | 10/2021 | Olarig et al. |

FOREIGN PATENT DOCUMENTS

| | | |
|---|---|---|
| CN | 107148070 A | 9/2017 |
| KR | 20180083488 A | 7/2018 |

* cited by examiner

*Primary Examiner* — Eugene Yun
(74) *Attorney, Agent, or Firm* — Patent Law Works LLP

(57) ABSTRACT

A data storage device comprises a non-volatile storage medium configured to store user data, a data port configured to transmit data between a host computer system and the data storage device, an energy harvesting component configured to produce electrical energy from an ambient energy source, and a beacon component, configured to wirelessly transmit a signal. The beacon component is configured to consume the electrical energy to wirelessly transmit the signal. The data storage device may further comprise an energy store configured to store the electrical energy produced by the energy harvesting component as stored energy.

20 Claims, 8 Drawing Sheets

WIRELESS DEVICE LOSS PREVENTION AND DISCOVERY

TECHNICAL FIELD

This disclosure relates to a data storage device that wirelessly transmits beacon signals to facilitate loss prevention of the data storage device by a user.

BACKGROUND

Data storage devices (DSDs) are electronic devices with the capability to store information in the form of digital data. DSDs are typically deployed as an integrated part of, or as a removable component configured to interface with, a computing system for the purpose of improving the data transmission and storage capabilities of the system. From the perspective of the computing system, a DSD is typically implemented as a block storage device where the data stored is in the form of one or more blocks, being sequences of bytes or bits having a maximum length, referred to as block size.

External DSDs are commonly used to supplement the data storage capabilities of a computer system. For example, external DSDs are often standalone physical devices which house an internal storage component, such as a hard disk drive (HDD) or a solid state drive (SSD), that provides a host computing system with an additional portion of non-volatile memory (i.e., the volume of the drive) in which to store digital data. These external drive type devices are connectable to the host computer system via a data path operating over a particular connectivity protocol (e.g., via Universal Serial Bus (USB) cable). In response to being connected to the host computer system, the host computer system recognizes the external drive as a block data storage device such that a user of the device may access the storage of the drive via the data path (e.g., through operation of the host computer). Access to the drive typically enables a user to access (e.g., read, write and/or modify) user data stored on the drive.

A user may use a DSD to store data that is proprietary, confidential, important or otherwise sensitive. Accordingly, in many circumstances, it is desirable to ameliorate the risk of the user losing physical possession of the DSD.

SUMMARY

Disclosed herein is a data storage device comprising a non-volatile storage medium configured to store user data, a data port configured to transmit data between a host computer system and the data storage device, an energy store configured to store electrical energy, and a beacon component configured to wirelessly transmit a signal. The beacon component is configured to consume at least some of the electrical energy to wirelessly transmit the signal.

In some embodiments, the energy store comprises an energy harvesting component configured to produce the electrical energy from an ambient energy source. In some embodiments, the ambient energy source comprises one or more of a radio frequency energy source, a kinetic energy source or a thermal energy source. In some embodiments, the energy harvesting component comprises one or more solar cells, and the ambient energy source comprises a solar radiation source.

In some embodiments, the data port comprises a power port configured to receive power from a power interface, and the energy store is configured to receive at least a portion of the electrical energy from the power interface via the data port.

In some embodiments, in response to the power port being electrically disconnected from the power source, the beacon component is configured to consume at least some of the stored energy to wirelessly transmit the signal. In some embodiments, in response to the power port being electrically connected to the power source, the beacon component is configured to consume energy received from the host computer system to wirelessly transmit the signal.

In some embodiments, the energy store comprises at least one capacitor for storing the stored energy. In some embodiments, the at least one capacitor comprises a plurality of capacitors forming a capacitor bank.

In some embodiments, the signal comprises a unique identification code that uniquely identifies the data storage device. In some embodiments, the signal comprises information indicative of the state of the data storage device.

In some embodiments, the beacon component is configured to determine an occurrence of a beacon trigger event, and in response to the occurrence of the beacon trigger event, wirelessly transmit the signal.

In some embodiments, the data storage device is configured to be associated with an associated user device, wherein the beacon component is further configured to receive a received signal transmitted by the associated user device, determine an indication of the signal strength of the received signal, and determine an indication of the proximity of the associated user device to the data storage device, based on the indication of the signal strength. In some embodiments, determining the occurrence of the beacon trigger event comprises determining that the indication of proximity exceeds an acceptable distance.

In some embodiments, the signal comprises a first signal, and the beacon component is further configured to wirelessly transmit a second signal at a beacon interval after the beacon component wirelessly transmitted the first signal. In some embodiments, the beacon component is configured to wirelessly transmit one or more signals in accordance with a beacon configuration, wherein the beacon configuration defines at least one of a beacon interval, or a beacon transmission power.

In some embodiments, the beacon component is configured to adjust the beacon configuration based on at least one of a motion of the data storage device, a time of the day, a current day or date, an indication of a proximity to an associated user device, a connection status of the data storage device to the host computer system, a power availability level associated with the power manager, a measure of the energy stored in the energy store, a measure of ambient light outside the data storage device, a measure of ambient temperature outside the data storage device, a last physical location of the data storage device, historical data of any of the above list, or a pattern detected in the historical data of any of the above list.

In some embodiments, the beacon component is further configured to receive a received signal, and in response to receiving the received signal, perform at least one of wirelessly transmit a response signal, cause the data storage device to emit a visual signal, or cause the data storage device to emit an audible signal.

In some embodiments, the signal comprises a first signal, and the beacon component, is further configured to wirelessly transmit the first signal in accordance with a first signal configuration, and wirelessly transmit a second signal in accordance with a second signal configuration. In some embodiments, the first signal configuration differs from the second signal configuration based on at least one of a communication protocol, a transmission frequency, or a packet format.

In some embodiments, the beacon component is configured to transition from a sleep mode to an awake mode, and in response to wirelessly transmitting the first signal and wirelessly transmitting the second signal, transition from the awake mode to the sleep mode.

Disclosed herein is a method for transmitting a beacon signal from a data storage device. The data storage device comprises a non-volatile storage medium configured to store user data, a data port configured to transmit data between a host computer system and the data storage device, an energy store configured to store electrical energy, and a beacon component. The beacon component is configured to wirelessly transmit a signal. The method comprises wirelessly transmitting the signal, wherein wirelessly transmitting the signal consumes at least some of the electrical energy stored in the energy store.

Disclosed herein is a data storage device comprising means for storing user data, means for transmitting data between a host computer system and the data storage device, means for storing electrical energy, and means for wirelessly transmitting a signal. The means for wirelessly transmitting a signal consumes at least some of the electrical energy stored in the means for storing electrical energy.

Disclosed here in a data storage device comprising a non-volatile storage medium configured to store user data, a data port configured to transmit data between a host computer system and the data storage device, a beacon component, and a power manager configured to provide electrical energy to the beacon component. The beacon component is configured to wirelessly transmit a signal in accordance with a beacon configuration, and in response to determining a power availability level associated with the power manager, adjust the beacon configuration to change a rate of consumption of the electrical energy by the beacon component.

In some embodiments, the beacon component is further configured to wirelessly transmit a second signal in accordance with the adjusted beacon configuration. In some embodiments, the beacon configuration defines at least one of a beacon activation status, a beacon interval, or a beacon transmission power. In some embodiments, the data storage device further comprises a power port configured to receive electrical energy from a power interface, and provide electrical energy to the power manager.

In some embodiments, the power availability level comprises an indication of whether the power port is electrically connected to a power source. In some embodiments, adjusting the beacon configuration comprises, in response to the power availability level indicating that the power port is electrically connected to the host computer system, performing at least one of setting the beacon activation status from inactive to active, decreasing the beacon interval, or increasing the beacon transmission power level.

In some embodiments, adjusting the beacon configuration comprises, in response to the power availability level indicating that the power port is electrically disconnected from the power source, adjusting the beacon configuration to reduce a rate of consumption, by the beacon component, of electrical energy provided to the beacon component by the power manager.

In some embodiments, the power manager further comprises an energy store configured to store electrical energy. In some embodiments, the energy store comprises an energy harvesting component configured to produce the electrical energy from an ambient energy source. In some embodiments, the data storage device further comprises a power port configured to receive electrical energy from a power source, and the energy store is configured to store at least a portion of the electrical energy received from the power source. In some embodiments, the energy store comprises at least one capacitor for storing the stored energy.

In some embodiments, the power availability level comprises an indication of a quantity of energy stored in the energy store. In some embodiments, in response to the quantity of energy stored in the energy store being less than a minimum quantity of energy, the power manager is configured to set the power availability level to a minimum power availability level, and the beacon component is configured to, in response to the power availability level being set to the minimum power availability level, adjust the beacon configuration to reduce a rate of consumption, by the beacon component, of electrical energy provided to the beacon component by the power manager.

In some embodiments, the beacon configuration comprises a beacon activation status, and adjusting the beacon configuration comprises setting the beacon activation status to inactive. In some embodiments, the beacon configuration comprises a beacon interval, and adjusting the beacon configuration comprises increasing the beacon interval.

In some embodiments, the beacon configuration comprises a beacon clustering activation status. In some embodiments, the signal comprises a first signal, and the beacon component, is further configured to, in response to the beacon clustering activation status being active wirelessly transmit the first signal in accordance with a first signal configuration, and wirelessly transmit a second signal in accordance with a second signal configuration. In some embodiments, the first signal configuration differs from the second signal configuration based on at least one of a communication protocol, a transmission frequency, or a packet format.

In some embodiments, the beacon component is configured to transition from a sleep mode to an awake mode, and in response to wirelessly transmitting the first signal and wirelessly transmitting the second signal, transition from the awake mode to the sleep mode.

Disclosed herein is a method for transmitting a beacon signal from a data storage device. The data storage device comprises a non-volatile storage medium configured to store user data, a data port configured to transmit data between a host computer system and the data storage device, a beacon component configured to wirelessly transmit a signal, and a power manager configured to provide electrical energy to the beacon component. The method comprises wirelessly transmitting the signal in accordance with a beacon configuration, and in response to determining a power availability level associated with the power manager, adjusting the beacon configuration to change a rate of consumption of electrical energy by the beacon component.

Disclosed herein is a data storage device comprising means for storing user data, means for transmitting data between a host computer system and the data storage device, means for wirelessly transmitting a signal in accordance with a beacon configuration, and means for providing electrical energy to the means for wirelessly transmitting a signal. In response to determining a power availability level associated with the means for providing electrical energy, the means for wirelessly transmitting a signal adjusts the beacon configuration to change a rate of consumption of electrical energy by the means for wirelessly transmitting a signal.

BRIEF DESCRIPTION OF DRAWINGS

Some embodiments are described herein below with reference to the accompanying drawings, wherein.

DESCRIPTION OF EMBODIMENTS

Data storage devices described herein provide an improved solution for ameliorating the risk of loss of possession of the DSD by the user, and improved methods of tracking the location of the DSD by the user.

The data storage devices described herein comprise beacon functionality which enables the DSD to wirelessly broadcast beacon signals. The beacon signals may be received by a user device operated by a user of the data storage device. The beacon signals facilitate the user to determine the location of the data storage device via signal-strength based proximity detection protocols. The beacon signals may further provide alerts to the user, via the user device, to ameliorate the risk of the user physically abandoning the data storage device, either intentionally or otherwise.

It is an advantage of the described embodiments that the beacon functionality of the data storage device is not powered by a battery. In some embodiments, the data storage device does not contain a battery. The elimination of the battery from the data storage device may reduce user complexity, shipping complexity, and product cost.

Data Storage Device

Figure 1:
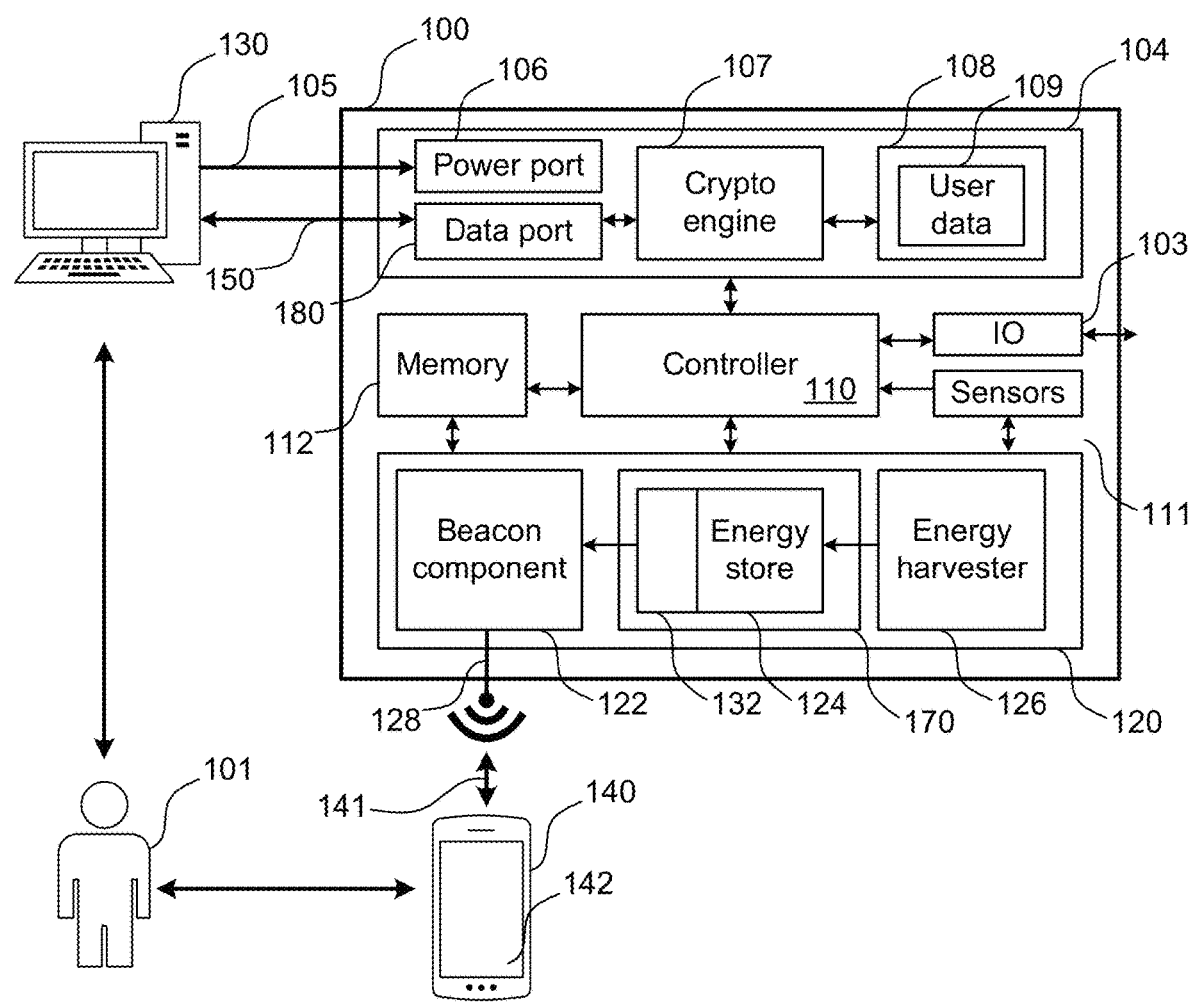
FIG. 1 illustrates a data storage device, in accordance with an embodiment.

FIG. 1 illustrates a data storage device (DSD) 100, in accordance with an embodiment. The DSD 100 comprises a data path 104 and a controller 110. The data path 104 comprises a data port 180 configured to transmit data between a host computer system 130 and the DSD 100. The DSD 100 is configured to register with the host computer system 130 such as to provide functionality to the host computer system 130 of a block data storage device. DSD 100 further comprises storage medium 108 to store user content data 109. The user content data 109 includes one or more blocks of data organized into files, for example including images, documents, videos, etc., in accordance with a particular file system operable by the host computer system 130.

The storage medium 108 is non-transitory such as to retain the stored block data irrespective of whether the medium 108 is powered. The medium 108 may be a hard disk drive (HDD) with a rotating magnetic disk or a solid state drive (SSD) and its variations like SLC (Single Level Cell), eMLC (Enterprise Multi Level Cell), MLC (Multi Level Cell), TLC (Triple Level Cell), and QLC (Quadruple Level Cell), and combinations of the above such as SSHD. Any other type of non-volatile storage media may also be used, including emerging non-volatile memory such as Program in Place or Storage Class Memory (SCM), such as ReRam, PCM, and MRAM. Further, the storage medium 108 may be a block data storage device, such that the user content data 109 is written in blocks to the storage medium 108 and read in blocks from the storage medium 108.

Host Computer System

The host computer system 130 comprises one or more processing components. In one embodiment, the host computer system 130 comprises a personal computer, such as a desktop computer or a laptop computer. The host computer system 130 comprises a device driver which is configured to communicate with the DSD 100 over data interface 150. Accordingly, the DSD 100 is configured to receive and transmit data to the host computer system 130, over data interface 150, via data port 180.

User and User Device

FIG. 1 further illustrates a user 101, who is an authorized user of the DSD 100. The user 101 utilizes a user device 140, which may comprise a mobile phone, laptop, personal computer, or other device capable of communication with the DSD 100.

The user device 140 and user 101 may be authorized to control the operation of the data storage device 100. In such case, the user device 140 is referred to as an authorized user device 140 or an associated user device 140.

In the example illustrated in FIG. 1, the user device 140 is a mobile phone with a user application 142 installed that implements the steps described as being performed by the user device 140. The user 101 may use the user device 140 to control the operation of the data storage device 100. The DSD 100 is communicatively connected to the user device 140 via communication channel 141. In the example illustrated in FIG. 1, the authorized device 140 is a smart phone, and the communication channel 141 is a Bluetooth LE connection.

The user device 140 and the data storage device 100 establish a communication channel by pairing through the establishment of a Bluetooth LE connection. The Bluetooth LE connection forms a control channel via which the authorized device and the data storage device can communicate.

In some embodiments, the user application 142 is configured to monitor aspects of the status of the DSD 100. In particular, the user application 142 works to prevent the loss of the DSD 100 by the user 101, and assists with the location of the DSD 100 by the user 101 in the event that the user 101 losses the DSD 100.

The user device 140 comprises a transceiver, which enables the user application 142 to receive beacon signals or packets from the DSD 100. In some embodiments, the transceiver of the user device 140 enables the user application 142 to transmit beacon signals or packets, which may be received by the DSD 100.

Cryptography Engine

The DSD 100 includes a cryptography engine 107 configured to receive, interpret and execute commands received from host computer system 104 in accordance with a predetermined command set, such as for example the standard Advanced Technology Attachment (ATA) or serial ATA (SATA) and/or ATA Packet Interface (ATAPI) command set, which is available from Technical Committee T13 noting that identical functionalities can be implemented within Trusted Computing Group (TCG) Opal, Small Computer System Interface (SCSI) and other proprietary architectures.

The cryptography engine 107 is connected between the data port 180 and the storage medium 108 and is configured to use a cryptographic key to encrypt user content data 109 to be stored on the storage medium 108, and to decrypt the encrypted user content data 109 stored on the storage medium 108 in response to a request from the host computer system 130. The controller 110 causes the cryptography engine 107 to control a cryptographic state of the user content data 109 (i.e., encrypted or plain). In one mode of operation, the unencrypted data may pass through the data path 104 to the host computer system 130 via the data port 180.

IO Interface

The data storage device 100 may include an input/output (ID) interface 103. The IO interface 103 may include one or more input components configured to accept an input from the user 101. For example, the input components may include a set of buttons or a keypad, or a similar arrangement of mechanical components that collectively enable the selection of digits or characters for entering into the device 100. The input components may also include one or more communications devices, such as a wireless modem, configured to receive and transmit data wirelessly via the transmission of an electronic message in a predetermined form.

The IO interface 103 may include one or more output components configured to indicate information to the user 101. For example, the output components may include a speaker, configured to emit audible signals, one or more visual indicators, such as a light or a display, configured to emit visual signals.

In one embodiment, the visual indicators include at least one data access state indicator configured provide the user 101 with an indication of the data access state of the DSD 100. The DA state indicator visually displays the data access state to user 101.

DSD Enclosure

The DSD 100 includes an enclosure configured to physically house the components of the device 100. The enclosure is formed from a rigid, or semi-rigid, material with particular properties (e.g., electrical resistance and impact strength) suited to protecting the internal components of device 100. For example, the material of the enclosure may include a polycarbonate (PC), an acrylonitrile butadiene styrene (ABS), an acrylic, a thermoplastic polyester, a metal, or a combination of any of these.

Controller

The DSD 100 further comprises a controller 110. The controller 110 may be comprised of one or more processors, microprocessors, microcontrollers or controlling circuitry. The controller 110 is configured to execute program code stored within the system memory 112 to issue commands for controlling the operation of the DSD 100. The system memory 112 stores device specific data, including at least a unique identifier of the DSD 100, referred to as the device identity key (IDK). The system memory 112 may further store configuration information which defines the function of the DSD 100. The DSD 100 may receive configuration information from the user 101 via the user device 140, and store the configuration information in the system memory 112.

The function of the controller 110 includes, but is not limited to, controlling data transmission through data path 104, controlling operation of the cryptography engine to direct the encryption or decryption of the user content data 109 by cryptography engine 107, and controlling the operation of the loss prevention and discovery (LPD) subsection 120, as described herein below.

Power Interface

In the embodiment illustrated in FIG. 1, the DSD 100 further comprises a power port 106 which is configured to receive electrical power from power interface 105. The power interface 105 may be electrically connected to the host computer system 130, such that the host computer system 130 is a power source and the power port 106 receives power from the host computer system. In another embodiment, the power interface 105 is electrically connected to a component other than the host computer system 130. The power interface 105 may comprise a wired electrical connection to a power source. The power interface 105 may comprise a wireless electrical connection to a power source.

The power port 106 and the data port 180 may be implemented collectively as, for example, some form of USB port (e.g., USB-A, USB-8, USB-C, mini-USB, micro-USB, etc.), a Thunderbolt port, a Power over Ethernet (PoE) port, or a similar port. In one embodiment, the power interface 105 comprises a USB interface which is configured to supply typically 5 V at 500 mA or higher currents.

In one embodiment, the power interface 105 comprises a wireless charging interface. The wireless charging interface may utilize electromagnetic induction to provide electrical power to the DSD 100. In one embodiment, the power interface 105 electrically connects the DSD 100 to the host computer system 130. In another embodiment, the power interface 105 electrically connects the DSD 100 to a power source that is not part of the host computer system 130.

In one embodiment, the DSD 100 consumes power from the power interface 105 to operate the electronic circuitry of the DSD 100. In some embodiments, the DSD 100 is configured to consume power from the power interface 105 to charge rechargeable components of the energy store 124.

In one embodiment, in response to the DSD 100 being electrically connected to host computer system 130 via interface 105, the DSD 100 consumes power from the host computer system 130 to operate the electronic circuitry of the DSD 100. In some embodiments, in response to the DSD 100 being electrically connected to the host computer system 130 via the power interface 105, the DSD 100 is configured to consume power from the host computer system 130 to charge rechargeable components of the energy store 124.

In some embodiments, to comply with the USB specification or to manage specific properties of the energy store 124, the energy store 124 may be charged at a limited current or voltage rate to comply with specifications and to protect or increase the lifetime usage of the energy store 124. In response to the DSD 100 being disconnected from the host, the energy store 124 may power a subset of the electronic circuitry, such as the beacon component 122 and sensors 111, to minimize power usage and extend the total duration of the disconnected device.

Loss Prevention and Discovery Subsection

The DSD 100 further comprises a loss prevention and discovery (LPD) subsection 120. The LPD subsection 120 comprises a beacon component 122, a power manager 170, comprising an energy store 124 and an energy selector 132, and an energy harvester 126 (otherwise called an energy harvesting component 126).

The LPD subsection functions to reduce the risk of physical loss of the device from the user's possession and/or to assist the user 101 to find the device in the event that it has been lost, misplaced, or relocated. The LPD subsection provides alerts to the user 101, in the form of wirelessly transmitted signals that can be received by the user application 142, to remind the user 101 not to physically leave behind the DSD 100. In one embodiment, the LPD subsection provides audible or visual alerts through the IO 103.

The LPD subsection also facilitates location of the DSD 100 by the user 101 through the transmission of beacon signals which may be used by compatible devices, including user device 140, to enable the user 101 to locate the DSD 100.

Beacon Component

The beacon component 122 comprises a wireless transceiver 128. The beacon component 122 transmits and receives wireless signals in accordance with a wireless communication protocol, via the transceiver 128. The beacon component 122 transmits beacon signals periodically, in accordance with a beacon interval. The beacon component 122 is further configured to receive signals via transceiver 128, such as signals transmitted by user application 142 operating on the mobile device 140. The beacon component 122 implements a beacon algorithm which defines the triggers that cause the beacon component 122 to transmit a beacon signal, and the parameters and configuration of the transmitted beacon signal.

Wireless Communication Protocols

In the embodiment illustrated in FIG. 1, the beacon component 122 transmits and receives signals in accordance with the Bluetooth Low Energy (BLE) wireless protocol. In other embodiments, the beacon component may emit a beacon signal via alternative wireless protocols, such as Ultra Wideband (UWB), Long-Term Evolution (LTE) or a Low-Power Wide-Area Network (LPWAN) protocol.

The Bluetooth Low-Energy (BLE) protocol is a wireless communication protocol which enables wireless communication whilst ensuring low energy consumption. The BLE standard provides a communication range of around 70 meters, depending upon the characteristics of the terrain. The power output of the BLE system can be controlled to reduce power output when needed. Additionally, a BLE beacon can be transmitted at a longer distance than a standard BLE packets, and therefore the power output may be reduced to conserve power consumption.

Beacon Signal

The beacon signal comprises a unique identification code (ID), which uniquely identifies the DSD 100. The unique ID may uniquely identify the DSD 100 across the world, or may only uniquely identify the DSD 100 amongst a set of devices. The unique ID may comprise the device identity key (IDK), as stored in system memory 112.

The beacon signal may further comprise additional information indicative of the state of the DSD 100. The additional information may comprise the lock state of the DSD 100 (locked or unlocked), the motion state of the DSD 100 (moving or stationary), the temperature of the DSD 100, the power status of the DSD 100, the location of the DSD 100, the duration that the DSD 100 has been unplugged from the host computer system 130, or other information describing the state of the DSD 100 or information obtained by the DSD 100.

Audio and Visual Outputs

In the embodiment illustrated in FIG. 1, the IO components 103 comprise an audio emitter or speaker, or LED indicator, which is operably coupled to the beacon component 122, via controller 110. The beacon component 122 can cause the speaker to emit an audible signal, such as a beep or a tune. The audible signal may assist the user 101 locate the DSD 100. Additionally or alternatively, the audible signal may alert the user 101 to a possible loss event.

In one embodiment, the DSD emits an audible signal in response to receiving a request signal from the user device. In one embodiment, the DSD emits an audible signal in conjunction with transmitting a beacon signal.

The IO components 103 further comprises a visual output component in the form of a light-emitting diode (LED) light. In some embodiments, the visual output component may comprise one or more of a visual display, one or more lights, a color change surface or other visual indicator. In one embodiment, the DSD 100 is configured to pulse the LED to emit a bright light that can indicate to the user 101 of the location of the DSD 100, especially in low ambient light environments.

Battery-Free Implementation

In the embodiment illustrated in FIG. 1, the DSD 100 does not include a battery that provides power to the beacon component 122 or the transceiver 128. Rather, the beacon component 122 is powered by energy stored in energy storage 124, or by power received over the power interface 105.

Advantageously, the exclusion of a battery from device 100, whether built-in or user replaceable may lower the cost of manufacturing the device 100, may reduce user complexity and maintenance, and may avoid special shipping costs associated with devices that include a battery. The exclusion of a battery may also avoid having to increase the size of the DSD product to accommodate the battery. Furthermore, the exclusion of a battery may reduce the complexity of the design of the DSD enclosure.

In some embodiments, a battery may be included in the DSD to supplement the energy supply of the energy harvester 126. In an embodiment in which a battery is included in the DSD, the inclusion of non-battery energy storage and/or energy harvesting may mean that the size of the required battery may be reduced. In an embodiment in which a battery is includes, the battery may be a primary or secondary cell. In the case of a primary cell, the battery may be permanently embedded in the DSD 100 and be intended to only last for a specific product lifetime or be user replaceable. In the case of a secondary cell, additional charging circuitry can be included to replenish the energy in the cell when plugged into a host computer system 130 per the battery's electrical requirements.

Powering the Beacon Component

In the embodiment illustrated in FIG. 1, the beacon component 122 is configured to receive and consume power supplied by any one or a combination of the energy store 124, the host computer system 130 via power interface 105, or the energy harvester 126.

When the DSD 100 is electrically connected to the host computer system 130 via power interface 105, the beacon component 122 utilizes power received from the host computer system 130 via power interface 105. The DSD 100 may be electrically connected to the host computer when the USB connector of the DSD 100 is plugged into the USB port of the host computer system 130. In response to the DSD 100 not being electrically connected to the host computer system 130 (e.g. in response to the DSD not being physically connected to the host computer, or the host computer being turned off), the beacon component 122 utilizes power received from the energy store 124 or the energy harvester 126.

Energy Store

The energy store 124 is configured to store energy produced by the energy harvester 126 from one or more ambient energy sources, as described herein. The energy store 124 is further configured to provide power to the beacon component 122. In one embodiment, the energy store 124 is configured to store energy received via power interface 105, in response to the DSD 100 being electrically connected to the host computer system 130.

The energy store 124 and energy harvester 126 provide the beacon component 122 with an alternative source of power in response to the DSD 100 being electrically disconnected from the host computer system 130. In some embodiments, the energy store 124 also provides power to other components within the DSD 100.

Figure 2:
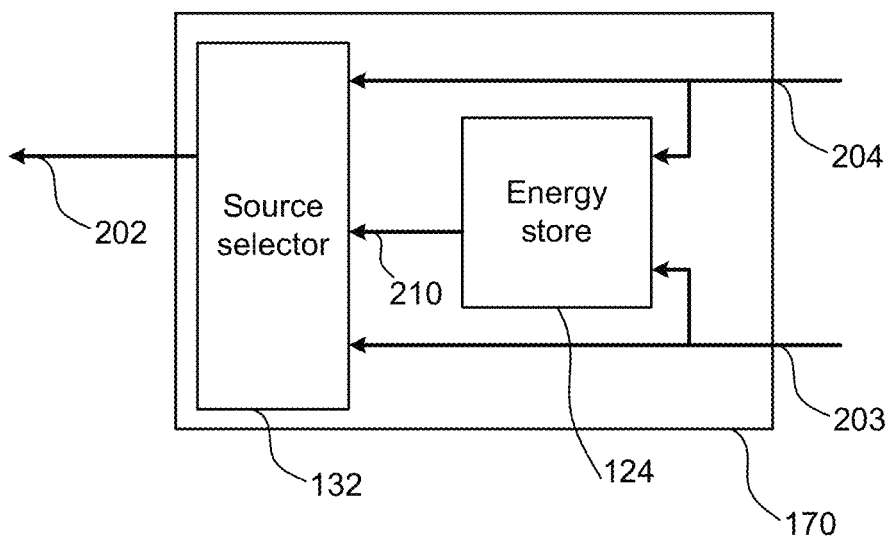
FIG. 2 illustrates an energy store, in accordance with an embodiment.

FIG. 2 illustrates the power manager 170, in accordance with an embodiment. The power manager 170 comprises the energy store 124, which receives power from power interface 105 via input 204. The energy store 124 also receives power from the energy harvester 126 via input 203.

The power manager 170 further comprises the source selector 132. The source selector 132 is configured to select a power source from one of the energy harvester 126 via input 203, the energy store 124 or the power interface 105 via input 204. The source selector 132 provides power to the beacon component 122 via output 202. In some embodiments, the source selector 132 is configured to combine power sources 203, 124 and 204 to provide power to the beacon component 122.

In one embodiment, in response to both the energy harvester 126 and the power interface 105 providing an active power source, the source selector 206 is configured to preferentially power particular device components from a single source. For example, power supplied to the beacon component 122 may be obtained preferentially from the host computer system 130 via the power interface 105 when the DSD 100 is electrically connected to the host computer system 130. In this case, the power that would otherwise be supplied by the energy harvester 126 may be used to charge the energy store 124. Additionally, the energy store may be replenished from the host computer system 130 power.

This is advantageous in that it enables the energy store 124 to provide a more consistent power supply when power is no longer available from the power interface 105, and in response to a temporary inability of the energy harvester 126 to generate new power (i.e., if there is no solar radiation incident on the device 100, or no RF energy to harvest in the vicinity of the device 100).

In response to the DSD 100 being electrically disconnected from the host computer system 130, such that the DSD 100 is not receiving electrical energy from the host computer system 130, the energy store 124 is configured obtain power from the energy harvester 126 to power the beacon component 122. In some embodiments, even without the supply of power from the power interface 105 the beacon component 122 receives power from the energy store 124 to enable the beacon component 122 to perform functions.

The power manager 170 is configured to monitor and control the functionality of the energy store 124 and the source selector 132. Through control of the energy store 124 and the source selector, the power manager 170 is configured to provide electrical energy to the beacon component 122. In one embodiment, the power manager 170 is configured to determine and set a power availability level. The power availability level is an indication of the power available to provide to the beacon component 122 for operation of the beacon component.

In one embodiment, the power availability level provides an indication of how much energy is currently, or anticipated to be, stored in the energy store 124. In one embodiment, the power manager 170 is configured to set the power availability level to a minimum power availability level in response to the quantity of energy stored in the energy store being less than a minimum quantity of energy. For example, the power availability level may comprise an indication of 'low', 'medium' and 'high', and in response to the quantity of energy being stored in the energy store 124 being less than 25% of the storage capacity of the energy store 124, the power manager may set the power availability level to 'low'.

In one embodiment, the power availability level comprises a binary indicator ('true', 'false'), which indicates whether power is available or whether power is not available. The power manager may determine that power is available in response to the DSD 100 be electrically connected to the host computer system 130 via power port 106. Conversely, the power manager may determine that power is not available in response to the DSD 100 being not electrically connected to the host computer via power port 106. In one embodiment, the power manager 170 is configured to set the power availability level to a minimum power availability level (e.g. 'false') in response to the DSD 100 not being electrically connected to the host computer system 130 via power port 106. Accordingly, the power availability level may comprise an indication of whether the power port 106 is electrically connected to the host computer system 130.

In an embodiment in which the power interface 105 comprises a wired or wireless interface to a power source other than the host computer system 130, the power availability level may comprise an indication of whether the power port 106 is electrically connected to another power source.

Energy Store Comprising a Capacitor Bank

In one embodiment, the energy store 124 comprises one or more capacitors. The use of one or more capacitors, rather than a battery, to store energy can provide advantages in terms of ease and durability of integration of the energy storage components into the DSD. These advantages may facilitate manufacturing, security and cost minimization. In another embodiment, the energy store 124 comprises a rechargeable battery.

Capacitor Bank

Figure 3:
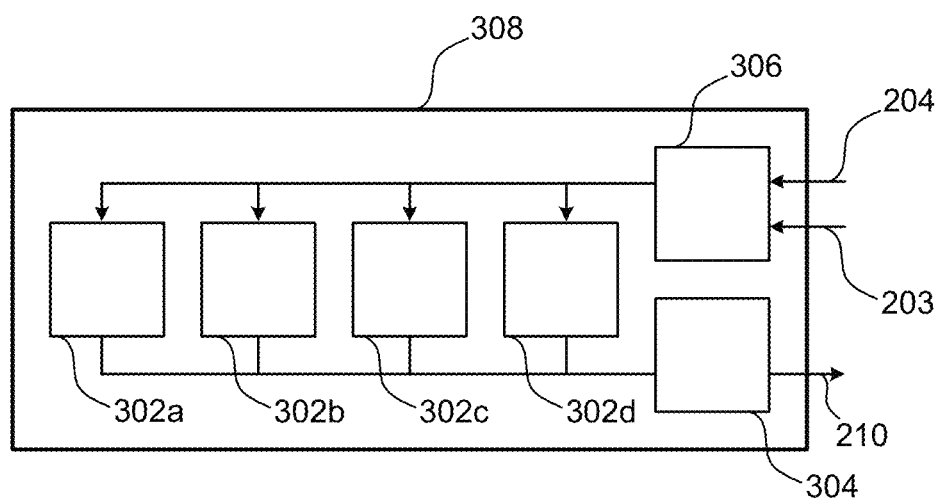
FIG. 3 illustrates an energy store implemented as a capacitor bank, in accordance with an embodiment.

FIG. 3 illustrates the energy store 124 implemented as a capacitor bank 308, in accordance with an embodiment. The capacitor bank 308 comprises a plurality of capacitors 302a-d and an input DC converter 306 and an output DC converter 304. The capacitors 302a-d are electrically coupled to the power interface 105 via input DC converter 306 and input wire 204, such that the capacitors 302a-d receive charge, via the power interface 105, from the host computer system 130, when the DSD 100 is electrically connected to the host computer system 130. When the DSD 100 is removed from the host computer system 130, the capacitors 302a-d will no longer receive charge via the power port 106.

The capacitors 302a-d of capacitor bank 308 are connected in parallel. In some embodiments, the capacitors 302a-d may be connected serially. The capacitor bank 308 comprises four capacitors; however, another implementation of the capacitor bank may comprises fewer or more capacitors. The size of the capacitor bank shall be determined for the use case and cost of the product, such as being able to beacon for several hours, several days, or even weeks.

In other embodiments, the energy store may further comprise an energy manager to monitor the charging of the capacitors in the capacitor bank and to load balance the charging of the capacitors in the capacitor bank.

Figure 4:
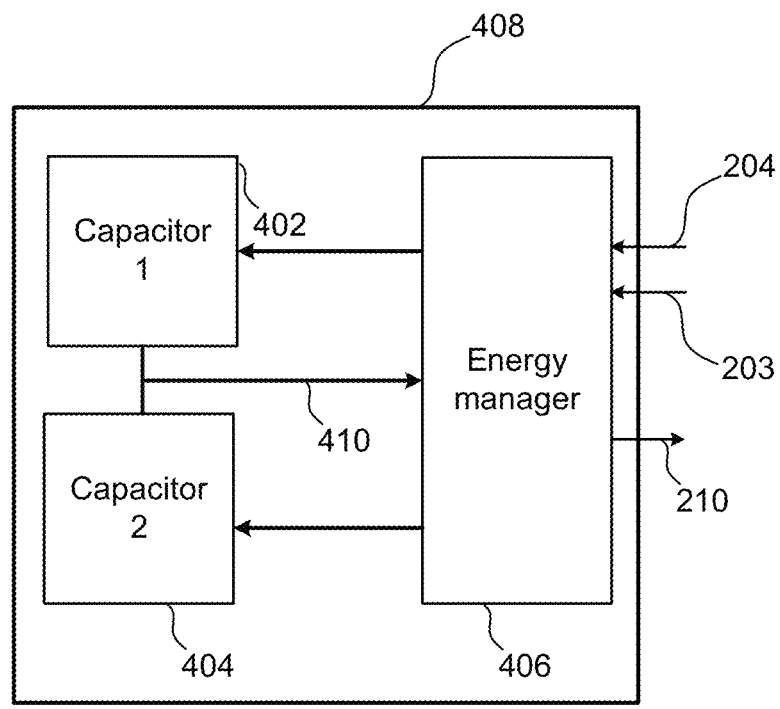
FIG. 4 illustrates an energy store implemented as a capacitor bank, in accordance with another embodiment.

FIG. 4 illustrates energy store 124 implemented as a capacitor bank 408, in accordance with an embodiment. Capacitor bank 408 comprises two capacitors 402 and 404, and an energy manager 406. The energy manager 406 comprises monitor points to load balance the charging of capacitors 402 and 404. The energy manager 406 is electrically coupled to the power interface 105 via input wire 204, such that the capacitors 402 and 404 receive charge, via the power interface 105, from the host computer system 130, when the DSD 100 is electrically connected to the host computer system 130. The energy manager 406 also receives charge from the energy harvester 126 via input 203. The energy manager 406 provides charge to the energy selector 132 via output 210.

Figure 5:
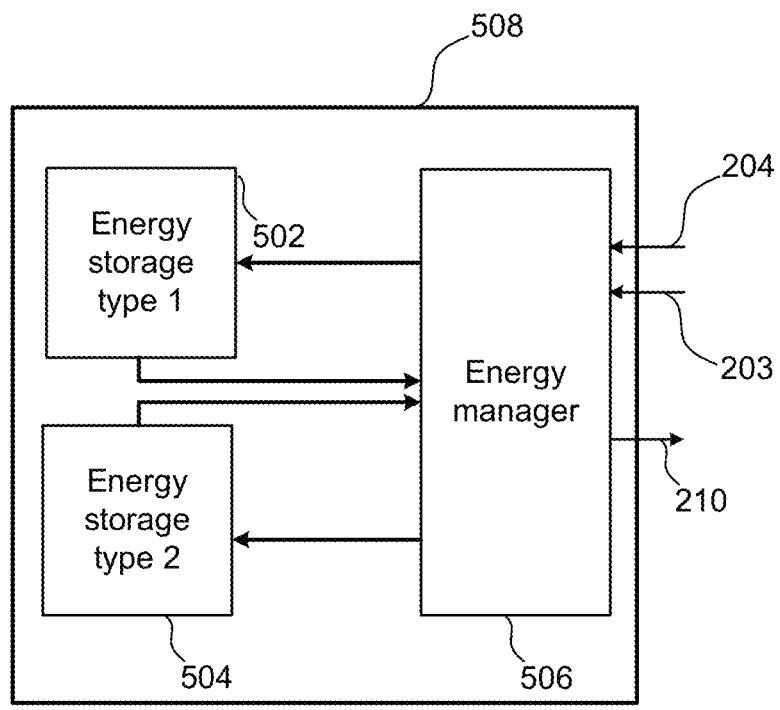
FIG. 5 illustrates an energy store comprising two different energy storage types, in accordance with an embodiment.

In some embodiments, the energy store 124 may comprise a plurality of different energy storage types. FIG. 5 illustrates energy store 124 comprising two different energy storage types 502 and 504, in accordance with an embodiment. Different energy storage types may comprises different capacitor types or battery storage.

Alternative Configurations of Energy Store

In some embodiments, the energy store 124 may comprise a rechargeable battery configured to be charged by the energy harvester 126 or by the power interface 105, or by both the energy harvester 126 and the power interface 105. In some embodiments, the energy store 124 may be a conversion or pass-through module enabling the beacon component 122 to be powered by the energy harvester 126. In some embodiments, the energy store 124 may comprise a combination of energy storing and provision means, including a combination from capacitor storage, rechargeable battery storage, non-rechargeable battery storage and energy pass-through from an energy harvester.

Energy Harvesting

In one embodiment, the DSD 100 uses energy harvesting (or power harvesting) to convert ambient energy from the environment around the DSD to produce electrical energy. The produced electrical energy may be consumed by components of the DSD. An ambient energy source may comprise a radio frequency (RF) energy source, a kinetic energy source, a solar energy source, a thermogradient energy source, vibrational excitation energy source, pressure gradient energy source, or other source of energy which may be converted to electrical energy.

In the embodiment illustrated in FIG. 1, the DSD 100 includes an energy harvester 126 electrically connected to, at least, the beacon component 122. The energy harvester 126 is configured to produce electrical energy from an ambient energy source. The produced electrical energy may power the beacon component 122 and the transceiver 128. Advantageously, the electrical energy produced by the energy harvester 126 may enable DSD 100 to self-sufficiently power the beacon and/or sensor functionality, without reliance on an electrical connection with the host computer system 130 or the inclusion of a battery.

In one embodiment, the energy harvester 126 produces electrical energy from an ambient energy source comprising at least one of a radio frequency source, solar radiation or a kinetic energy source. In some embodiments, the energy harvester 126 comprises a plurality of energy harvesting means which each produce electrical energy from a different ambient energy source.

Solar Based Energy Harvesting

Figure 6:
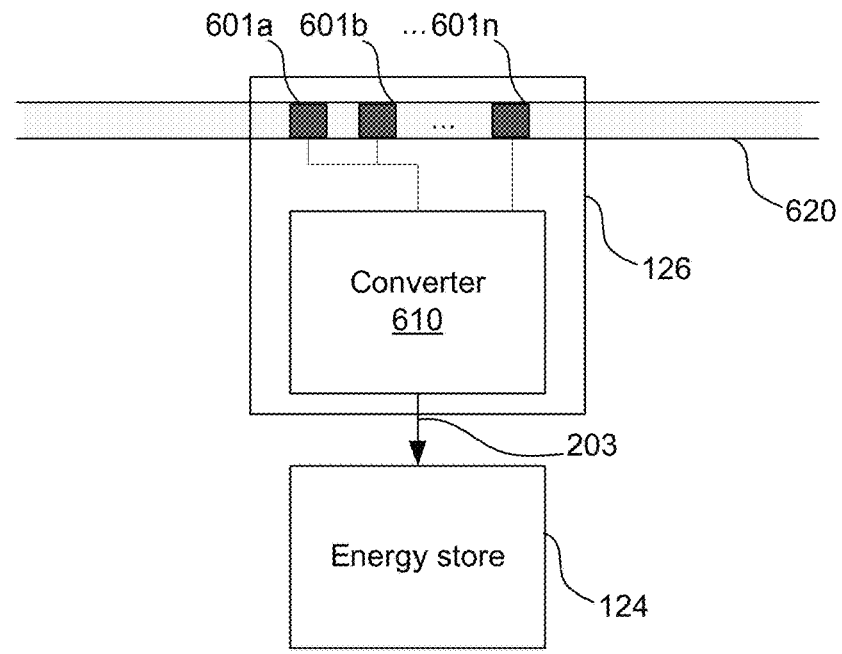
FIG. 6 illustrates an energy harvester configured to produce electrical energy from solar radiation incident on the data storage device, in accordance with an embodiment.

FIG. 6 illustrates the energy harvester 126 configured to produce electrical energy from solar radiation incident on the DSD 100, in accordance with an embodiment.

The energy harvester 124 comprises one or more solar cells 601a-601n and a converter module 610. The energy harvester 124 provides power to the energy store 124 via output 203. Solar cells 601a-601n are formed on, or integrated within, an outer surface 620 of the DSD 100 such as to be exposed to solar radiation within an environment of the DSD 100. In one example, the cells 601a-601n are organized within a miniature solar panel, where the panel itself is embedded into, or affixed to, the outer surface 620 of the DSD 100. Alternatively, the cells 601a-601n may be incorporated into a flexible and semi-transparent thin-film coating that is printed onto the outer surface 620 of the DSD 100 (i.e., as a 'solar ink').

For example, in one embodiment each solar cell 6601a-601n is a perovskite solar cell including: a perovskite absorber layer acting as the light-harvesting active layer composed of mesoporous TiO2 coated with a perovskite absorber; and n-type and p-type material layers for electron and hole extraction respectively, where the n-type and p-type material layers are contacted with the active layer to promote the extraction of photo-generated electrons. Perovskite cells 601a-601n implemented as single-junction cells, as described above, operate at approximately 25 percent power conversion efficiency (PCE) rating. However, a maximum efficiency of approximately 29% is possible by implementing the cells as silicon-based tandem cells.

The converter 610 is electrically connected to each cell 601a-601n, and is configured to receive electrical charge generated by the cells 601a-601n. The converter 610 accumulates the charge generated by each individual cell 601a-601n and outputs an electrical current to the energy store 124 via output 203.

The converter 610 may be implemented as an ultralow-power circuit configured to regulate the voltages of power provided by the solar cells, in order to extend the functional life of the module. Some implementations of the energy harvester 126 may not include the converter 610 such that the energy store 124 receives charge directly from solar cells 601a-601n.

RF Energy Harvesting

Figure 7:
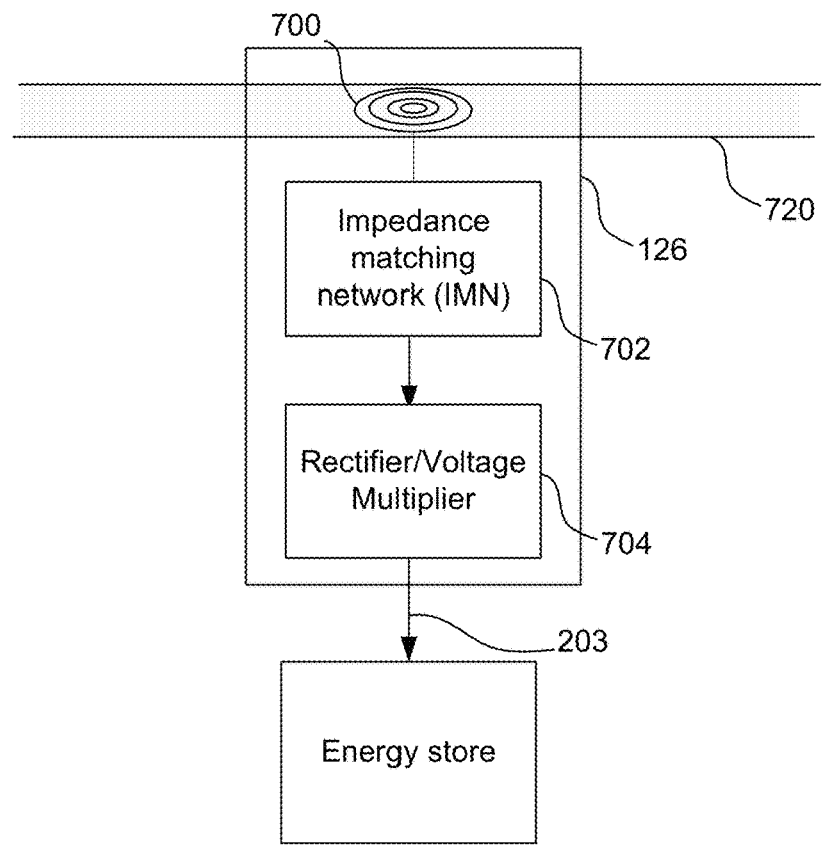
FIG. 7 illustrates an energy harvester configured to produce electrical energy from RF waves in the environment of the data storage device, in accordance with an embodiment.

FIG. 7 illustrates the energy harvester 126 configured to produce electrical energy from RF waves in the environment of the DSD 100, in accordance with an embodiment. RF wireless energy harvesting generates energy from electromagnetic waves by capturing and converting electromagnetic energy into a usable continuous DC voltage signal. An energy harvester 126 implemented as an RF harvester may harvest energy from ambient or active transmissions around the device, such as 2.4 GHz wireless signals or 900 MHz ambient signals. The harvested energy can be stored in the capacitor bank 308 of the energy store 124, and used by the beacon component 122 as needed.

In the described example, the energy harvester 126 comprises an antenna 700, an impedance matching network 702, and a rectifier/voltage multiplier 704. The energy harvester 124 provides power to the energy store 124 via output 203.

The energy harvester 126 is configured to continuously control and harness the RF energy in the environment of the DSD 100 as emitted by an RF source (e.g., as satellite stations, wireless internet, radio stations, and digital multimedia broadcasts).

The RF source (not shown) is typically connected to a transmitting antenna that emits radio waves. Antenna 700 is configured as a receiving antenna to capture some of the emitted waves enabling conversion into an electrical signal. In this disclosure, the term "antenna" refers to any RF capturing element, including, but not limited to, a single element antenna, an antenna array, or an inductive coil.

As illustrated in FIG. 7, antenna 700 is implemented as a flat planar coil mounted behind a thin protective layer that does not attenuate RF energy. For example, the antenna 700 may be formed using a multi-coil assembly, with the coil diameter set to the maximum length permitted by an outer surface 720 of the DSD 100 (i.e., in order to maximize the wavelength).

For capturing RF signals that have been transmitted in a particular wavelength band, the receiving antenna may be configured to be similar to the antenna that transmitted the RF signals. In some embodiments, the antenna 700 is configured to receive RF energy from RF signals transmitted within a specific wavelength band. For example, in an embodiment in which the antenna 700 is configured to receive RF energy from RF signals transmitted at 2.4 GHz, the antenna 700 may be the same type of design as an antenna configured to transmit signals at 2.4 GHz.

In some embodiments, the antenna 700 may comprises a plurality of receiving antennae, each tuned to receive RF signals in different frequency bands e.g. 2.4 GHz, 900 MHz, 5 GHz etc.

A coil assembly designed for close-proximity wireless charging may be used in some embodiments, such as where the coil is adapted to extract RF energy from different bands if coupled to a low-loss tuning circuit. Antenna 700 may be formed integrally within the material of the outer surface 720 to provide protection against physical wear or damage. In other embodiments, the antenna 700 may be affixed to the outer surface 720 of the DSD 100 and housed within a separate enclosure (e.g., as a pre-fabricated multi-coil assembly).

The power received by antenna 700 is determined by the distance between the RF source and the RF receiver (i.e., the DSD 100), the sensitivity of the receiver antenna, the characteristics of the receiving antenna, and the frequency of the RF signal. Assuming an unobstructed space and a source of isotropic transmission, the diffusion of waves in all directions is uniform. Therefore, the power per unit area at a distance from the source is inversely proportional to the square of the distance between the antennas. However, the transmitting antenna does not always transmit energy in a spherical way (isotropic antenna) but may transmit energy in some specific directions according to their design. The capacity and inductance of an antenna are functions of its frequency and physical size. The larger the antenna size, the lower the resonance frequency. Therefore, the there exists a trade-off between facilitating the reception of low-frequency waves (which requires a large aperture), and the design of a physically compact antenna 700 that is suitable for incorporation within the DSD 100. The bandwidth of an antenna is the frequency range in which the antenna can work efficiently. Narrow-band antennas offer good conversion efficiency but can only recover a limited amount of energy.

In general, power transmission and reception in free space is regulated by:

$$P_r = \frac{P_T G_t G_r}{(4\pi R)^2} \lambda^2$$

where $P_r$ and $P_T$ are the power in reception and transmission, $G_r$ and $G_t$ are the gains of the two antennas, $\lambda$ the wavelength of the RF emission, and R the distance between the two antennas.

As illustrated in FIG. 7, an impedance matching network 702 is applied between the antenna 700 and the rectifier 704. Since the RF energy extracted from the free space usually has a low power density, the impedance matching network (IMN) 702 is used to maximize the power transfer between the RF source and the load (i.e., to assist in producing enough DC energy from the electromagnetic waves to supply the loads).

The signal generated by the IMN 702 is rectified by the rectifier 704 to meet the application power requirements of the DSD 100. That is, the rectifier 704 functions as a voltage multiplier circuit that converts and amplifies the AC input (i.e., as produced by the IMN 702) to the DC output. DC output signal is supplied to energy store 124, as described above.

The performance of the energy harvester 126 implemented as a RF harvester to power at least the beacon component 122 may be represented by the efficiency of conversion of RF energy into DC (PCE) by the source (i.e., the ratio between the amount of power output from rectifier 704 and that recovered by the antenna 700).

In some embodiments, the components of the energy harvester 126 illustrated in FIG. 7 may be implemented according to a custom fabrication and configuration process especially designed for DSD 100. In other embodiments, the energy harvester 126 may be implemented as a pre-fabricated electronic circuit, such as for example, the Nano-Power band LTC3588-1 circuit by Analog, which provides a selectable output voltage from 1.8 V up to 3.6 V and output current up to 100 mA.

The selection and/or configuration of a pre-fabricated energy harvester 126 can impact upon the power generation properties of the energy harvester in particular environments of the DSD 100. For example, some types of RF harvesting circuits may be configured to function optimally in areas where the RF transmission occurs at 2.4 GHz. As this type of signal is primary produced by WiFi transmission, the power generated by the energy harvester 126 may be reduced in environments where such WiFi transmitters are infrequently encountered and/or sparsely located (e.g., in rural areas).

In one embodiment, the DSD 100 is configured to capture, alter, then remodulate back out energy waveforms from other Bluetooth devices to form a beacon or packet transmission that contains new information. In an embodiment where this bypasses a separate energy storage, the retransmitted waveform may be of lower energy as some energy is used to alter the waveform. As long as the lower energy waveform is of sufficient power, then the lower energy waveform may be used to provide a signal to the user device 140. BLE beacons are typically of lower power than a normal BLE packet transmission. In another embodiment, the circuitry that is modifying the waveform can leverage some power from another energy source.

Beaconing for Location Detection

To reduce the risk of loss of a DSD by a user, a beacon component of a DSD may periodically transmit beacon signals via wireless transceiver 128. The beacon signals may be used by one or more user devices in proximity of the DSD, to enable proximity-based location services that determine whether the DSD and user device are in range of each other. The proximity-based location services may facilitate location detection of the DSD by the user.

Location Discovery Example

Figure 8:
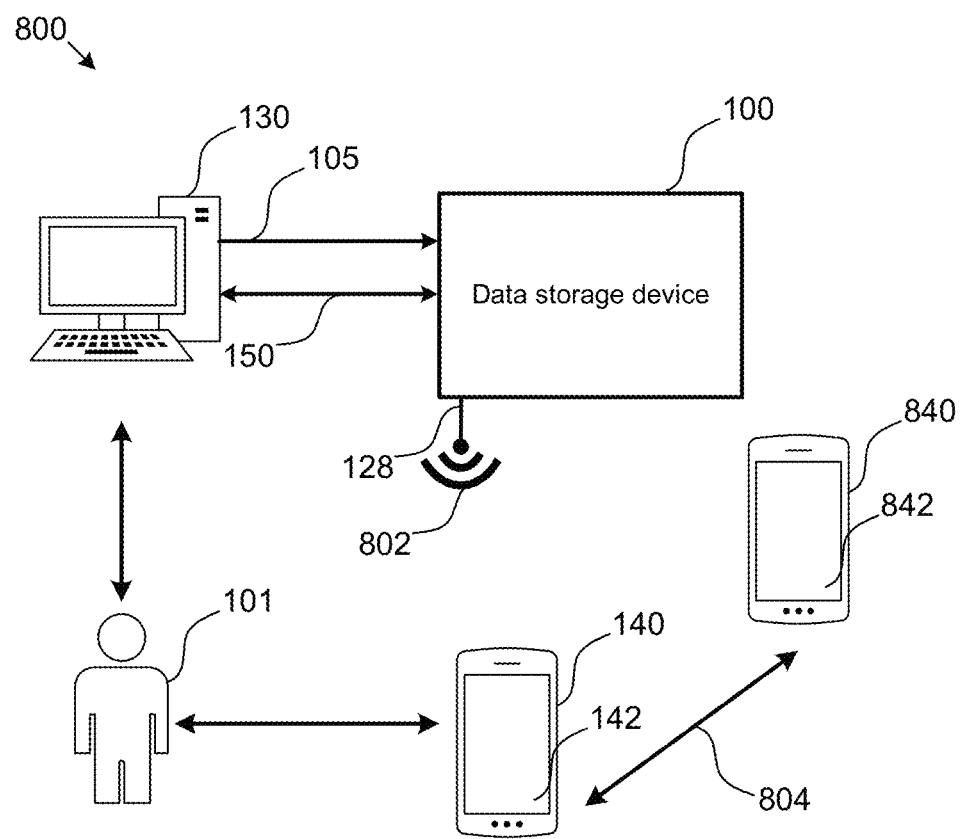
FIG. 8 illustrates a data storage device in a network, in accordance with an embodiment.

FIG. 8 illustrates a data storage device in a network 800, in accordance with an embodiment. The network 800 comprises DSD 100, host computer system 130, user 101 and user device 140 which is associated with user 101. The DSD 100 and user device 140 are configured to communicate via a Bluetooth LE protocol. The DSD 100 and user device 140 utilize Bluetooth Positioning to enable the user device 140 to determine the approximate position of the DSD 100.

The DSD 100 is configured to transmit a beacon signal 802 via transceiver 128. In one example, the beacon signal 802 is received by, at least, the user device 140. In response to receiving the beacon signal 802, the user device 140 determines an indication of the received signal strength of the beacon signal 802. The received signal strength is an estimate measure of power level of the received signal and provides an indication of the distance of the transceiver 128 from the user device 140.

Based on at least the signal strength of the received beacon signal 802, the user device 140 determines a proximity of the DSD 100 to the user device 140. In some implementations, user device 140 comprises a multi-antenna array which enables the user device 140 to determine, based on a comparison of signal strength determined at each of the antennas of the multi-antenna array, the angle of arrival (AoA) of the beacon signal. Based on the determined AoA, and an indication of the signal strength of the received beacon signal, the user device 140 determines the approximate direction and proximity of the DSD 100 relative to the user device 140. In an embodiment of DSD 100 which is configured to transmit signals in accordance with the UWB protocol, the use of a directional antenna or a calculation of time-of-flight between transmit pulses can also provide the user device 140 with directional and distance information.

The beacon component 122 periodically transmits the beacon signal, in accordance with a beacon interval. The beacon interval specifies a time between consecutive beacon signal transmissions.

Based on a consideration of the received signal strength, and/or the angle of arrival of each of a plurality of beacon signals, the user device 140 determines whether the location of the DSD 100 is changing relative to the position of the user 140.

In one embodiment, user application 142 executing on user device 140 is in communication with user application 842 executing on another user device 840, via communication link 804. In one example, user device 840 is close enough to the DSD 100 to receive the beacon signal 802. Based on a consideration of the received signal strength, and/or the angle of arrival of the beacon signal 802, the user device 840 determines an approximation of the location of the DSD 100 relative to the location of the user device 840. Via communication link 804, user device 840 communicates an indication of the location of the DSD 100 to user device 140, thus facilitating the location detection of the DSD 100 by user 101.

In some embodiments, network 800 comprises a plurality of beacon sensors, in addition to user device 140. A beacon sensor comprises a beacon enabled device deployed in a fixed location throughout an indoor space. With multiple beacon sensors strategically placed throughout an indoor space, communication between the beacons and a DSD within the indoor space can be used to determine the position of the DSD within the indoor space, via Received Signal Strength Indicator (RSSI) multilateration or time-of-flight between pulsed transmissions.

Additionally, other wireless receivers can be added to help determine the device location such as a Global Navigation Satellite System (GNSS) or WiFi (determine the nearby access point names). This information can then be added to the beacon transmission or use a transceiver to deliver this information to a WiFi or LPWAN (e.g., LTE) access point.

Beacon Configuration

In one embodiment, the beacon component 122 transmits beacons in accordance with a beacon configuration. The beacon configuration defines one or more of the parameters: a beacon activation status; a beacon interval; a beacon clustering activation status or a beacon transmission power. In some embodiments, the beacon configuration defines further parameters which define the functionality of the beacon component 122. The beacon configuration may be stored in system memory 112.

In one embodiment, the beacon component 122 transmits beacon signals periodically, waiting a period of time between transmitting consecutive beacon signals. This period of time is called a beacon interval.

The beacon activation status is a control status maintained by the beacon component 122 of the DSD 100. The beacon activation status indicates whether the transmission of beacon signals by the beacon component 122 is activated or deactivated.

The beacon transmission power is a configuration parameter which indicates a level of RF energy that the transceiver 128 emits during the transmission of a beacon signal. A beacon signal transmitted at a high beacon transmission power may be detectable at a further distance from the DSD 100 than a beacon signal transmitted at a lower beacon transmission power.

Beacon Trigger Event

The beacon component 122 is configured to determine the occurrence of a beacon trigger event in accordance with the beacon algorithm. In one embodiment, a beacon trigger event is an indication that the user 101 may have lost (or unintentionally abandoned) the DSD 100. The beacon component 122 is configured to transmit one or more beacon signals in response to a beacon trigger event occurring. In one embodiment, in response to the beacon component 122 determining the occurrence of a beacon trigger event, the beacon component 122 adjusts the beacon activation status to active and initiates the transmission of at least one beacon signal. In response to the beacon component 122 receiving a signal from the user device 140 confirming that the user 101 has possession of the DSD 100, the beacon component 122 adjusts the beacon activation status to inactive and ceases the periodic transmission of beacon signals.

Adjusting the Beacon Configuration

In some embodiments, the beacon component 122 is configured to adjust one or more of the parameters based on, one or more of: a motion of the data storage device; a time of day, a current day or date, a indication of a proximity to an associated user device; a connection status of the data storage device to the host computer system; a measure of the energy stored in the energy store; usage patterns of the user 101, a measure of ambient light outside the data storage device; a measure of ambient temperature outside the data storage device; a last physical location of the data storage device (this may be determined when the data storage device was last connected to the host computer system); data determined by sensors 111; signals received via the transceiver 128; network status or communication; historical data of any of the above list; or a pattern detected in the historical data of any of the above list.

In one embodiment, the beacon component 122 adjusts the beacon configuration to facilitate the location of the DSD 100 by the user 101. In some embodiments, the beacon component 122 adjusts the beacon configuration to reduce the rate at which energy is consumed by the beacon component 122. In one embodiment, the beacon component 122 adjusts the beacon configuration in response to determining, from the power manager 170, a power availability level associated with the power manager.

The beacon component 122 configures the beacon configuration (for example, the beacon interval and/or the beacon activation status) dynamically to balance the consumption of energy by the beacon component 122 and the transmission of beacon signals to garner the user's attention to facilitate location of the DSD 100 by the user 101.

Based on Proximity to User Device

In some embodiments, the beacon component 122 is configured to determine an indication of proximity of the user device 140 to the DSD 100. In an example, the beacon component 122 receives a beacon signal, or other wireless signal, transmitted by the user device 140. The beacon component determines an indication of the signal strength of the received signal, and based on the indication of the signal strength, the beacon component 122 determines an indication of the proximity of the user device 140 to the DSD 100.

The beacon component 122 is further configured to determine whether determined proximity of the user device 140 to the DSD 100 is within an acceptable distance. The beacon component may determine an acceptable distance based on a comparison of the received signal strength to a preferred signal strength.

If the beacon component 122 determines that the indication of proximity of the user device 140 to DSD 100 exceeds an acceptable distance of the user device 140, the beacon component 122 considers that the DSD 100 is in a lost state. The determination that the DSD 100 is in a lost state may comprise a beacon trigger event.

In some embodiments, the beacon component 122 reduces the beacon interval in response to the user device 140 moving closer to the DSD 100. In other words, in response to the beacon component 122 determining that signal strength of a beacon signal received by the transceiver 128 from the user device 140 is stronger than the signal strength of a preceding beacon signal received by the transceiver 128 from the user device 140, the beacon component 122 reduces the beacon interval. As a result of reducing the beacon interval, the beacon component 122 will transmit beacon signals at a high frequency, which may facilitate faster location of the DSD 100 by the user 101 using user device 140.

In one embodiment, the beacon component 122 determines the proximity of the user device by determining a moving average signal strength based on the signal strength of a plurality of beacon signals received by the transceiver 128 from the user device 140.

Conservation of Energy

When the DSD 100 is not connected to a host computer via power interface 105, the energy store 124 receives energy only from the energy harvester 126. In some situations, the quantity of energy that may be harvested via energy harvesting is limited. Accordingly, when the DSD 100 is not connected to the host computer, it may be advantageous to adjust the function of the beacon component 122 to consume energy at a slower rate or to cease the consumption of energy.

In one embodiment, the beacon component 122 adjusts the beacon interval, in order to reduce the consumption of energy stored in the energy store 124. The beacon component increases the time interval between transmitting beacon signals, thus reducing the frequency at which the beacon component 122 transmits beacon signals. Accordingly, the beacon component 122 trades off conserving power with a less frequent beacon interval versus improving tracking response time with a more frequent beacon interval.

Figure 9:
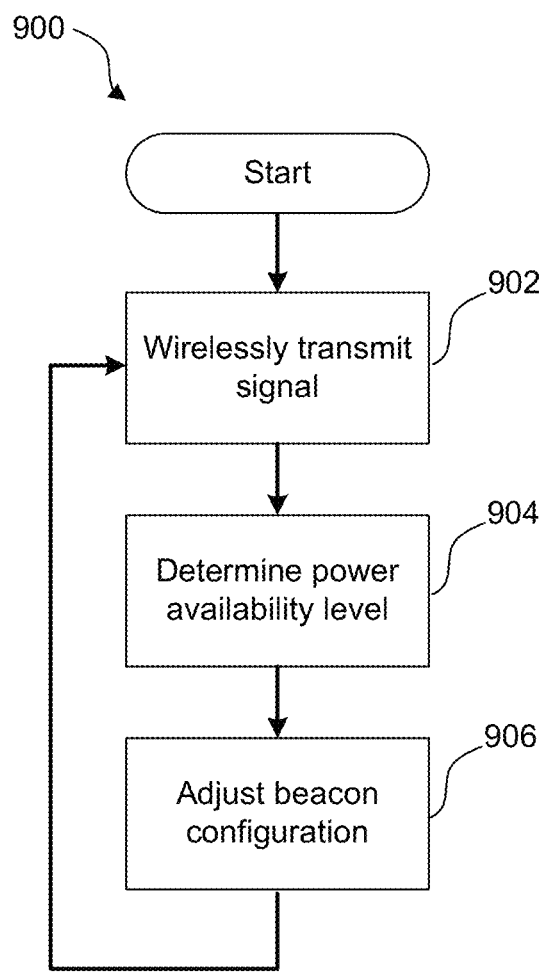
FIG. 9 illustrates a method, performed by the beacon component, to reduce the rate of consumption of energy by the beacon component, in accordance with an embodiment.

FIG. 9 illustrates a method 900, as performed by the beacon component 122, to reduce the rate of consumption of energy by the beacon component, in accordance with an embodiment. In step 902, the beacon component 122 transmits a beacon signal in accordance with a beacon configuration. In step 904, the beacon component determines a power availability level associated with the power manager 170. In step 906, the beacon component adjusts the beacon configuration to change a rate of consumption of electrical energy by the beacon component.

In one embodiment, the beacon component 122 determines a power availability level associated with the energy store 124. The beacon component 122 determines the power availability level by receiving an indication of the quantity of energy stored in the energy store 124, from the energy store 124. The indication of the quantity of energy may comprise an indication of the quantity of energy stored in the energy store 124 in relation to the storage capacity of the energy store 124.

The beacon component 122 adjusts the beacon configuration based on the power availability level to conserve energy stored in the energy store 124. For example, the beacon component 122 may increase the beacon interval as the power availability level decreases. If the energy store 124 receives additional charge, via the energy harvester 126 or via the power interface 105, the beacon component 122 may adjust the beacon configuration to increase the beacon interval, so that the beacon component transmits beacon signals more frequently.

In one embodiment, the beacon component 122 adjusts the beacon configuration based on the time of the day or the day of the week, as determined by the controller 110.

In one embodiment, the system memory 112 stores an indication of work hours for the user 101 associated with the DSD 100. Based on the indication of work hours, the current time and current day, the beacon component 122 determines whether the current time is within work hours of the user 101.

If the DSD 100 is in a lost state outside work hours, it is possible that there are no user devices within proximity of the DSD 100 to receive beacon signals transmitted by the beacon component 122. Accordingly, in one embodiment, the beacon component 122 transmits beacon signals at a reduced frequency (increased beacon interval) when the current time is outside of work hours. In one embodiment, the beacon component 122 deactivates the transmission of beacon signals when the current time is outside of work hours. In response to the current time being within work hours, the beacon component 122 may reactivate the transmission of beacon signals or may increase the frequency of transmission of the beacon signals.

In one embodiment, the beacon component 122 increases the beacon interval when the current time is outside work hours, to ensure that there is sufficient energy stored in the energy store 124 to transmit beacon signals when the current time is within work hours.

In one embodiment, the DSD 100 is configured with configuration information indicative of usage patterns of the DSD 100 by the user 101. The usage patterns may be stored in system memory 112. The usage patterns may indicate the permitted, or expected, days and times at which the DSD 100 is used by the user 101. In one embodiment, the DSD 100 is configured to derive the usage patterns by monitoring the usage of the DSD 100 by the user 101 over a period of time.

In one embodiment, the DSD 100 activates and deactivates the transmission of beacon signals based on the usage patterns. For example, in response to the usage patterns indicating that the user 101 comes home from work at 5 pm most nights and goes back to work at 8 am, the DSD 100 deactivates the transmission of beacon signals for the period 10 pm to 4 am each day. In another example, the DSD 100 may adjust the beacon interval based on the usage patterns indicating that the user 101 uses, or does not use, the DSD 100 on each day of the week or weekend period.

In one example, in response to the DSD 100 being disconnected from the host computer system 130 at a current time which, based on the usage patterns, is within the user's typical work time, the DSD 100 activates the transmission of beacon signals. Later, in response to the current time indicating, based on the usage patterns, a time that is outside the user's typical work time, the DSD 100 deactivates the transmission of beacon signals. The DSD 100 may be configured to reactivate the transmission of beacon signals when the current time progresses to a time that is within the user's typical work hours.

The DSD 100 may be configured to activate and deactivate the transmission of beacon signals, based on the user's typical work hours, only when the DSD 100 determines that the user device 140 is not within proximity of the DSD 100. This lack of proximity between the user device 140 and the DSD 100 may indicate that the user 101 has left the DSD 100 behind. Transmitting beacon signals when the user device 140 is not within proximity of the DSD 100 may not facilitate location of the DSD 100 by the user 101, as the user device 140 may not receive the beacon signals transmitted by the DSD 100. Accordingly, the deactivation of the transmission of beacon signals until such a time as the user is expected to return to the location at which the user last used the DSD 100 (e.g. within the user's typical work hours), may facilitate the conservation of the energy stored by the DSD 100.

In one embodiment, the DSD 100 is configured to determine one or more of the current date, current day of the week, or current time from the host computer system 130 via metadata associated with the latest file written to the DSD 100 by the host computer system 130 over data interface 150. Alternatively, the DSD 100 is configured to determine one or more of the current date, current day of the week, or current time from a BLE request received from the user device 140.

Maintaining a real-time clock and determining whether to adjust the beacon configuration (e.g. the beacon interval, beacon activation status, or transmission power) based on the time, may consume energy stored in the energy store. However, this consumption of energy may enable overall energy conservation, via the adjustment of the beacon configuration, thus facilitating the location of the DSD by the user over a longer period of time.

In some embodiments, the beacon component 122 adjusts the beacon configuration based on information received via sensors 111 of the DSD 100. In one embodiment, the sensors 111 comprise an accelerometer. In order to facilitate tracking of a DSD in motion, the beacon component 122 decreases the beacon interval in response to the accelerometer indicating motion of the DSD 100. Advantageously, transmitting beacon signals at a higher frequency may assist the user 101 to locate and secure the DSD before the DSD travels out of proximity of the user device 140.

In another embodiment, the beacon component 122 increases the beacon interval in response to the accelerometer indicating motion of the DSD 100. Advantageously, transmitting beacon signals at a lower frequency while the DSD is in motion, and therefore difficult to locate, may conserve sufficient energy so that the DSD may be located when it ceases motion.

In some embodiments, the beacon component 122 adjusts the beacon interval based on the length of time since the DSD was disconnected from power interface 105 of the host computer system 130.

In some embodiments, the beacon component 122 adjusts the beacon communication protocols (or standard), in response to a change in the connection status of the DSD 100 to the host computer system 130. In some embodiments, the beacon component 122 adjusts the beacon transmission power in response to a change in the connection status of the DSD 100 to the host computer system 130.

In some embodiments, the beacon component 122 adjusts the beacon interval based on the proximity of the user device 140 to the DSD 100. The beacon component 122 determines an indication of the proximity of the user device 140 to the DSD 100 based on the signal strength of beacon signals transmitted by the user device 140 and received by the transceiver 128 of the beacon component 122.

The beacon component 122 transmits beacon signals at a high frequency (short beacon interval) when the beacon component 122 determines that the user device 140 is within a close proximity of the DSD 100. The beacon component 122 may further decrease the beacon interval in response to the beacon component 122 determining that the user device 140 has come into closer proximity to the DSD 100. Advantageously, the increased frequency of transmission of beacon signals may facilitate location of the DSD by the user 101 of the user device 140.

In some embodiments, the sensors 111 comprise a light sensor configured to detect a level of ambient light incident on the DSD 100. The beacon component 122 may adjust the beacon interval, beacon activation status or beacon transmission power based on a level of ambient light detected by the light sensor. For example, if the light sensor detects that the room is dark around the DSD 100, the beacon component may assume that no user is nearby. Accordingly, to reduce the consumption of energy, the beacon component 122 may do one or more of: increase the beacon interval, deactivate beacon transmission or increase the beacon transmission power such that the transmitted beacon may reach a longer distance away from the DSD 100.

In some embodiments, the beacon component 122 adjusts the beacon configuration based on information, received by the DSD 100, regarding wireless networks or wireless transmitters in the vicinity of the DSD 100. Information regarding wireless transmitters may comprise BLE MAC address packets.

Beaconing for Loss Prevention

To ameliorate the risk of the user 101 unintentionally abandoning or losing the DSD 100, the DSD 100 monitors for the occurrence of a possible abandonment event, and in response to determining that a possible abandonment event has occurred, the beacon component 122 alerts the user 101 to the possible abandonment of the DSD 100.

In one embodiment, the beacon component 122 alerts the user 101 to the possible abandonment of the DSD 100 via the contents of a beacon signal transmitted from transceiver 128. The beacon signal comprises the unique identification code of the DSD 100. The beacon signal may further comprise an indication of the possible abandonment. The indication may be in the form of a digital code that indicates, to the user application 142, the occurrence of a possible abandonment event.

In the event that the user device 140 is within reception range of the DSD 100, the beacon signal transmitted by the beacon component 122 may be received by the user application 142 operating on the user device 140. In response, to receiving the beacon signal, the user application 142 generates an alert to the user 101 of the user device 140. The alert may be in the form of a visible or audible indication, cautioning the user of the possible abandonment of the DSD 100 and reminding the user to not leave the DSD 100 behind.

In some embodiments, the user may be facilitated to locate the position of the DSD 100 by the DSD emitting an audible signal, such as a beep, or a visual signal, such as a flashing light. Accordingly, in some embodiments, the DSD 100 provides an additional alert indication to the user 101, in conjunction with the beacon signal, or instead of the beacon signal, to alert the user 101 to the possible abandonment of the DSD 100. The additional alert indication may be an audible alert, or a visual alert such as an activated light at the external surface of the device, or a combination of an audible alert and a visual alert. The beacon component 122 causes the IO component 103 to emit the audible and visual alerts.

Disconnect from Host Computer

In some embodiments, the beacon component 122 determines that an abandonment event has occurred, in response to the device 100 being physically or operably disconnected from the host computer system 130. The power port 106 or the data port signals an indication of the disconnect event to the beacon component 122. In response to receiving the indication of the disconnect event from the power port 106, the beacon component 122 generates an alert signal to alert the user to the possible abandonment of the DSD 100. The alert signal may comprise a beacon signal that comprises information indicating a possible abandonment event and information indicating the nature of the possible abandonment event, in this case a disconnect event. The alert signal may comprise an audible, vibratory, and/or visual alert which the DSD 100 generates in response to the DSD 100 being physically or operably disconnected from the host computer system 130. If the host computer system 130 is a mobile device, such as a phone, the host computer system can be configured to generate an alert or a notification.

In some embodiments, the beacon component 122 waits for a period of time following receiving the indication from the power port 106 of the disconnect event to the beacon component 122, before determining that a possibly abandonment event has occurred.

In some embodiments, in response to receiving an indication of the disconnected event from the power port 106, the beacon component 122 determines the proximity of the user device 140 to the DSD 100. If the beacon component determines that the user device 140 is further than an acceptable distance from the DSD 100, the beacon component 122 generates an alert signal.

In one example scenario, a user sits at a desk, with the user device and the host computer on the desk. The DSD also rests on the desk, operably coupled to the host computer via the USB port of the host computer. The beacon component of the DSD uses proximity sensing to determine that the user device is proximal to the DSD. In this example, the beacon component is configured to consider a separation of less than 2 meters to be a proximal distance.

While the DSD remains operably coupled to the host computer, the beacon component periodically uses proximity sensing to determine the proximity of the user device to the DSD.

If the beacon component determines that the user device has moved to a distance greater than 2 meters from the DSD, the beacon component determines that the DSD is in a possible lost state. In response to determining that the DSD is in a possible lost state, the beacon component transmits a beacon signal, including an indication of a possible abandonment event.

If the beacon component receives a signal from the user device within an acceptable time (for example 5 seconds), and the beacon component determines that the signal from the user device has a signal strength that indicates that the user device is within a proximal distance, then the beacon component determines that the DSD is no longer in a possible lost state.

If the beacon component does not receive a signal from the user device within an acceptable time, the beacon component determines that the DSD is still in a possible lost state. The beacon component may then cause the IO component to emit audible or visual signals to alert the user to the possible abandonment of the DSD.

In one embodiment, the beacon component 122 is configured to adjust the beacon interval based on an amount of time that has passed since the DSD 100 was operably or physically disconnected from the host computer system 130. For example, in response to the DSD 100 being disconnected from the host computer system 130, the beacon component 122 configures the beacon interval to be short, thus transmitting beacon signals frequently to alert the user 101 to the disconnection of the DSD 100. In response to the DSD 100 being disconnected from the host computer system 130, the beacon component 122 may transmits beacon signals at a low power, on the assumption that the user 101 is nearby the DSD 100. However, in response to the amount of time that has passed since the DSD 100 was operably or physically disconnected from the host computer system 130 exceeding an initial time period (e.g. 3 seconds), the beacon component 122 may increase the beacon interval to conserve energy. In one embodiment, the beacon component 122 may increase the transmission power for transmission of the beacon signals for a period of time after the initial time period, to extend the range at which the user device 140 may receive the transmitted beacon signal. This increase in transmission power may enable the user device 140 to receive the transmitted beacon signal as the user 101 moves away from the DSD 100 after the DSD is disconnected from the host computer system 130.

Timeout from Last Data Transfer

In some cases, a long time interval since the last read or write operation between the DSD 100 and the host computer system 130 may signify that the user has ceased using the DSD 100, and has possibly left the DSD 100 behind.

To provide an alert to the user in such circumstances, in some embodiments, the DSD 100 monitors a time interval since last operation performed over the data interface 150 between the DSD 100 and the host computer system 130.

The operation may be a data transfer operation, such as a read operation, in which data is read from the DSD 100 to the host computer system 130 or a write operation, in which data is written from the host computer system 130 to the DSD 100. The beacon component 122 transmits a beacon signal in response to the time interval exceeding a time limit parameter stored in system memory 112.

For example, the time limit parameter may be set to 5 minutes. Accordingly, in response to a lack of operation occurring on the data interface 150 between the DSD 100 and the host computer system 130 for five minutes, the beacon component 122 transmits a beacon signal including an indication of a possible abandonment event. The user application 142 on the user device 140 receives the beacon signal transmitted by the beacon component 122, and in response to receiving the beacon signal, the beacon DSD Locked Status In one embodiment, the controller 110 maintains a status indication indicating whether the DSD 100 is in current use by the user 101 or not. The status indication may comprise an indication of the locked/unlocked status of the DSD, wherein the DSD is in a locked state when the user is not using the DSD and the DSD is in an unlocked state when the user is using the DSD. The DSD may transition from a locked state to an unlocked state in response to the user providing a login indication to the controller 110. The log-in indication may be accompanied by a valid user authentication. The DSD may transition from an unlocked state to a locked state in response to a log-off indication from the user. The log-in and log-off indications may be communicated from the user device 140 to the controller 110 via the host computer system 130 and data interface 150, or wirelessly via transceiver 128.

In one embodiment, the beacon component 122 determines the occurrence of a possible abandonment event in response to the DSD 100 entering a locked state in response to a log-off indication by the user 101, and the DSD 100 still being electrically connected to the host computer system 130 via power interface 105.

Time of Day

In some situations, the connection of a DSD to a host computer in a work location outside of typical work hours may indicate that a user has abandoned the DSD. Accordingly, in one embodiment, the beacon component 122 determines the occurrence of a possible abandonment event in response to the DSD 100 still being electrically connected to the host computer system 130 (via power interface 105) at a time that is outside an acceptable time period. The acceptable time period may indicate the work hours for a location or user.

Motion Detection

In some embodiments, the sensors 111 comprise an accelerometer which provides an indication of acceleration of the DSD 100 to the beacon component 122. The beacon component 122 adjusts the beacon interval based on the indication of acceleration. For example, the beacon component 122 may increase the beacon interval in response to the indication of acceleration indicating that the DSD 100 is stationary. Advantageously, the increased beacon interval conserves power usage. The beacon component 122 may also decrease the beacon interval, such that beacon signals are transmitted more frequently, in response to the indication of acceleration indicating that the DSD 100 is in motion. Advantageously, the more frequent transmission of beacon signals may facilitate the user 101 locating the DSD 100 by providing additional points of data to track the location of the DSD 100 in motion.

In some embodiments, the beacon component 122 is configured to receive a signal from the user application 142 on the user device 140, wherein the signal includes information indicative of a request for the DSD 100 to generate an audible or visible alert. Such a signal is called a ping signal. In response to receiving a ping signal, the beacon component 122 causes the IO component 103 of the DSD 100 to emit an audible or visible signal.

Example 1—Beacon Transmission

Figure 10:
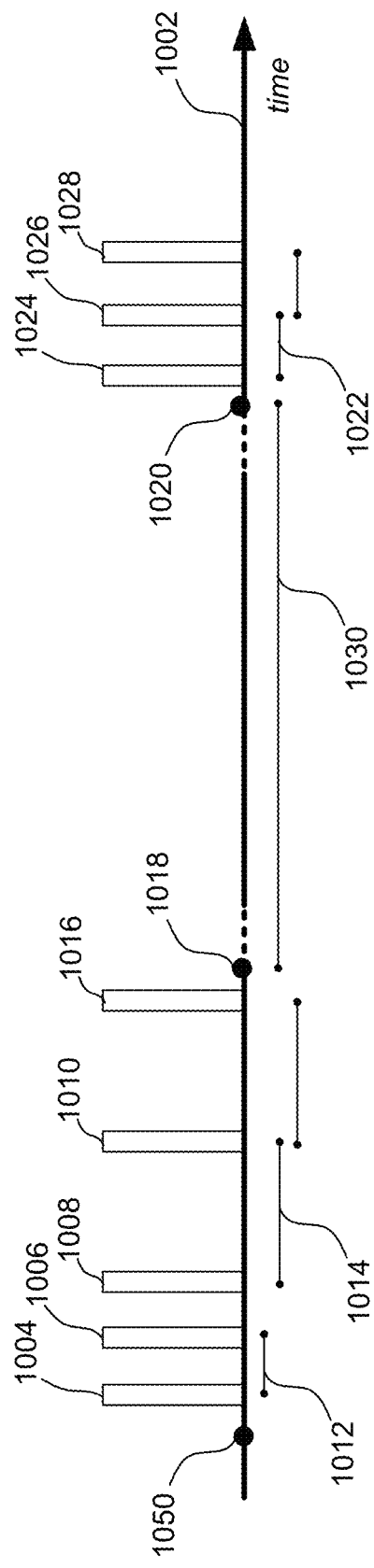
FIG. 10 illustrates a first example scenario in which the data storage device transmits a plurality of beacon signals, in accordance with an embodiment.

FIG. 10 illustrates a first example scenario in which the DSD 100 transmits a plurality of beacon signals, in accordance with an embodiment. Time line 1002 is indicative of the progression of time, with dashed sections of line 1002 being indicative of longer timespans that are not shown in FIG. 10. The transmission of beacon signals at a point in time is represented by elongated rectangles (e.g. rectangle 1004) situated on time line 1002.

At time 1050, the beacon component 122 sets the beacon activation status to active. The beacon component 122 may set the beacon activation status to active in response to determining a beacon trigger event or a possible abandonment event. In response to setting the beacon activation status to active, the beacon component 122 begins to transmit beacon signals in accordance with the beacon interval defined by the beacon configuration. In the example of FIG. 10, the beacon component 122 transmits beacon signals 1004, 1006 and 1008 at a beacon interval indicated by 1012.

To reduce the rate at which the beacon component 122 consumes energy, after transmitting three beacon signals (1004, 1006 and 1008) the beacon component 122 adjusts the beacon interval to a longer beacon interval, indicated by 1014, and transmits second beacon signals 1010 and third beacon signal 1016.

Time 1018 indicates the start of a time period 1030 which represents a time period outside the user's 101 work hours. In response to the beacon component 122 determining that the time 1018 is outside the user's 101 work hours, the beacon component 122 sets the beacon activation status to inactive. Accordingly, the beacon component 122 does not transmit beacon signals over the time period 1030.

Time 1020 indicates the start of the user's work hours. In response to the beacon component 122 determining that the time 1020 is within the user's 101 work hours, the beacon component 122 sets the beacon activation status to active, and begins to transmit beacon signals 1024, 1026 and 1028. In anticipation of the likelihood of the user device 140 being within proximity of the DSD 100 from time 1030, the beacon component 122 sets the beacon interval 1022 to enable frequent transmission of signals.

Example 2—Beacon Transmission

Figure 11:
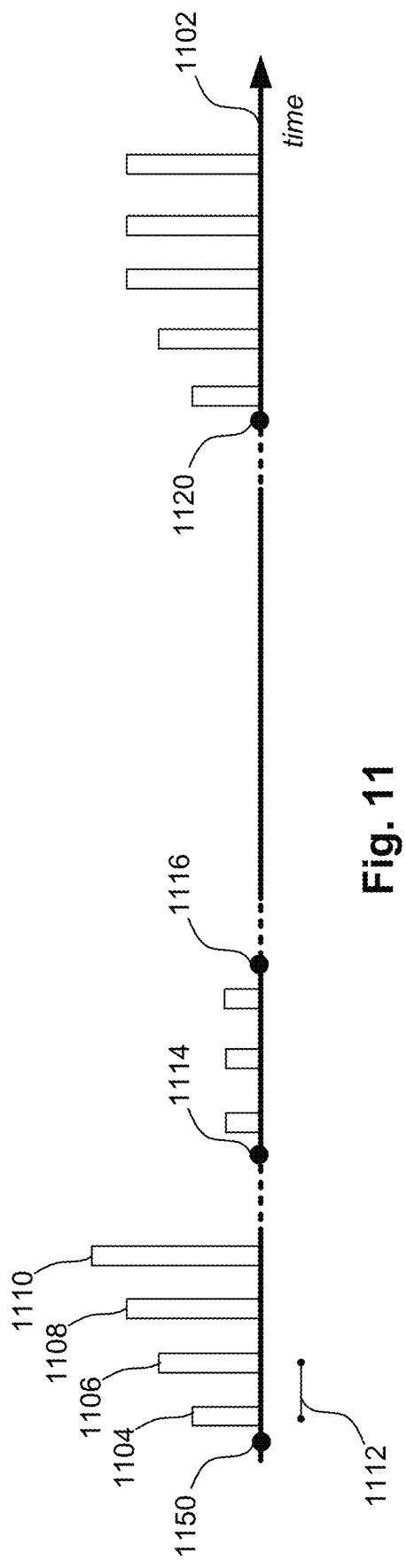
FIG. 11 illustrates a second example scenario in which the data storage device transmits a plurality of beacon signals, in accordance with an embodiment.

FIG. 11 illustrates a second example scenario in which the DSD 100 transmits a plurality of beacon signals, in accordance with an embodiment. Time line 1102 is indicative of the progression of time, with dashed sections of line 1102 being indicative of longer timespans that are not shown in FIG. 11. The transmission of beacon signals at a point in time is represented by elongated rectangles (e.g. rectangle 1104) situated on time line 1102, with the height of the rectangle being indicative of a transmission power associated with the beacon signal.

At time 1150, the beacon component 122 sets the beacon activation status to active. The beacon component 122 may set the beacon activation status to active in response to determining a beacon trigger event or a possible abandonment event. In response to setting the beacon activation status to active, the beacon component 122 begins to transmit beacon signals in accordance with the beacon interval 1112 defined by the beacon configuration. The beacon component 122 transmits each beacon signal (1104, 1106, 1108 and 1110) with an increasingly higher beacon transmission power, with the aim of ensuring that a beacon signal is received by the user device 140, which may be moving, with the user 101, further away from the DSD 100.

At time 1116, the beacon component 122 determines that the DSD 100 is not electrically coupled to the host computer system 130. Accordingly, to reduce the rate of the consumption of the energy stored by the energy store 124, the beacon component 122 adjusts the beacon configuration to reduce the beacon transmission power.

At time 1116, the beacon component 122 determines that the power availability level is less than the minimum power availability level. Accordingly, to conserve the remaining energy stored by the energy store 124, the beacon component 122 adjusts the beacon configuration to set the beacon activation status to inactive, and cease transmission of beacon signals.

At time 1120, the beacon component 122 determines that the power availability level is sufficiently high to enable the beacon component 122 to recommence transmission of beacon signals. Accordingly, the beacon component 122 adjusts the beacon configuration to set the beacon activation status to active. The power availability level may be sufficiently high due to the DSD 100 being electrically connected to a host computer system, or due to the energy store 124 receiving energy from the energy harvester 126.

Beacon Clustering

Some standard wireless protocols have unique beacon requirements. For example, the Bluetooth LE protocol may require the wireless transmission of beacon signals on different frequencies and possibly with different data packets to provide compatibility with receiving devices that operate older Bluetooth standards or newer standards with extended protocols. Each beacon signal transmitted by the beacon component 122 may be characterized in terms of a signal configuration. A signal configuration defines the beacon signal in terms such as the communication protocol, and version of the communication protocol that the beacon signal is compatible with, the transmission frequency at which the beacon signal is transmitted, or the packet format or data structure of the data transmitted as part of the beacon signal.

In one embodiment, the beacon component 122 is configured to operate in at least two different operational states, being a sleep mode and an awake mode. In the sleep mode, the beacon component 122 is configured to not transmit beacon signals. In one embodiment, while in the sleep mode, the beacon component 122 performs a reduced functionality beacon algorithm, where the reduced functionality beacon algorithm consumes less energy than a full functionality beacon algorithm.

In one embodiment, the beacon component 122 is configured to enter the sleep mode in response to the power availability level being less than a minimum power availability level. In one embodiment, the beacon component 122 is configured to enter the sleep mode in response to the power port being electrically disconnected from the host computer system.

To transmit a beacon signal, the reduced functionality beacon algorithm transitions the beacon component 122 into an awake state. This state transition process (e.g. "power-up" process) requires time to get the beacon component into a known state ready for transmission of a beacon signal. After the beacon signal is transmitted, the beacon algorithm may transition the beacon component 122 back into the sleep state, via a "power-down" process. The "power-up" and "power-down" uses a certain amount of power. Therefore, in response to the beacon component determining that multiple, different beacon signals are to be broadcast, the beacon component may conserve power usage by minimizing the number of times the "power-up" and "power-down" transitions occur.

In one embodiment, the beacon component 122 conserves power usage by transmitting the multiple different beacon signal consecutively, between a "power-up" and a "power-down" transition. This process is called beacon clustering. In an example, clustering three beacon signals for consecutive transmission in between a single "power-up" and a "power-down" transition, saves 2 "power-up" and "power-down" states. This may conserve power that would be consumed to transition the beacon component, multiple times, between awake and sleep modes.

Example 3—Beacon Clustering

Figure 12:
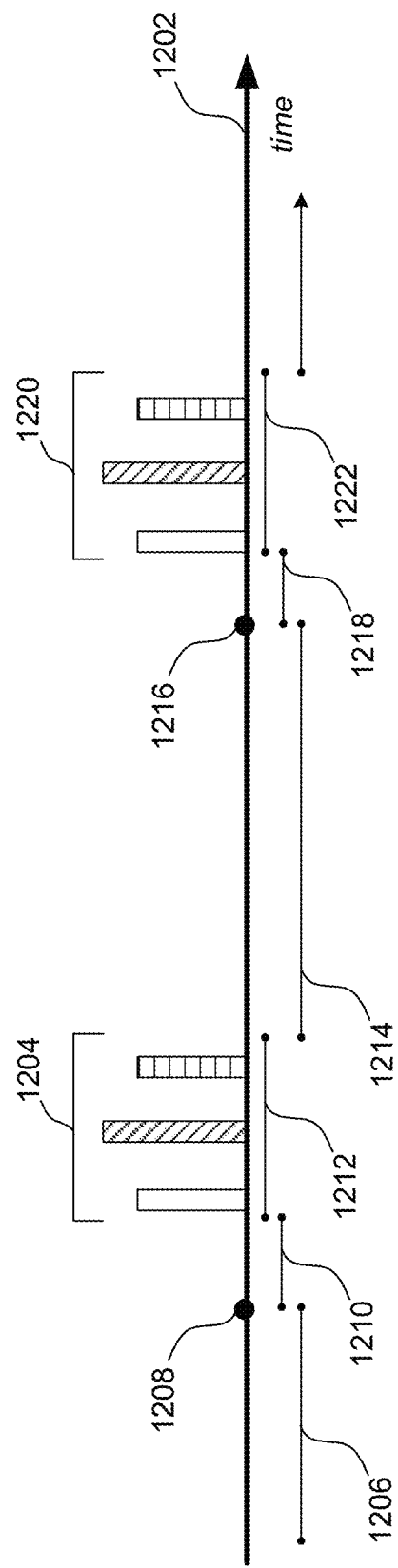
FIG. 12 illustrates a third example scenario in which the data storage device transmits a plurality of beacon signals, in accordance with an embodiment.

FIG. 12 illustrates a second example scenario in which the DSD 100 transmits a plurality of beacon signals, in accordance with an embodiment. Time line 1202 is indicative of the progression of time. The transmission of beacon signals at a point in time is represented by elongated rectangles (e.g. rectangles 1204) situated on time line 1202, with the different shadings of the rectangle being indicative of different signal configurations associated with the beacon signals.

In the example illustrated in FIG. 12, the DSD has been electrically disconnected from the host computer system and the beacon algorithm executing on the beacon component 122 attempts to conserve the energy stored in the energy store by adjusting the beacon configuration to set the beacon clustering activation status to active. The active beacon clustering activation status causes the beacon component 122 to transmit beacon signals in clusters at hourly intervals, with the beacon component 122 reverting to a low-power sleep mode in between beacon cluster transmissions.

During time period 1206, the beacon component 122 is in a sleep mode. At time 1208, the beacon algorithm executing on the beacon component 122 determines that a beacon trigger event has occurred (e.g. it has been 1 hour since the previous beacon cluster transmission). During time period 1210, the beacon component powers up from the sleep mode to an awake mode. During time period 1212 the beacon component transmits three beacon signal (collectively 1204), with each beacon signal being transmitted in accordance with a different signal configuration. The beacon component then powers down into a sleep mode for time period 1214. At time 1216, the beacon component 122 determines that another beacon trigger event has occurred (e.g. it has been 1 hour since the transmission of beacon signals 1204). Accordingly, the beacon component powers up from the sleep mode to an awake mode during time period 1218, and transmits a second cluster of beacon signals 1220 during time period 1222.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited.

It will be appreciated by persons skilled in the art that numerous variations and/or modifications may be made to the above-described embodiments and examples, without departing from the broad general scope of the present disclosure. The present embodiments are, therefore, to be considered in all respects as illustrative and not restrictive.

In this specification, a statement that an element may be "at least one of" a list of options is to be understood to mean that the element may be any one of the listed options, or may be any combination of two or more of the listed options.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

The invention claimed is:

1. A data storage device comprising:
   a non-volatile storage medium configured to store user data;
   a data port configured to transmit data between a host computer system and the data storage device;
   a power interface configured to provide power to the data storage device responsive to connection to a power source;
   an energy store configured to store electrical energy; and
   a beacon component configured to wirelessly transmit a signal, wherein, responsive to the power interface being in a disconnected state:
      the energy store is further configured to:
         selectively provide energy to the beacon component; and
         not provide energy for storing user data to the non-volatile storage medium; and
      the beacon component is further configured to consume at least some of the stored electrical energy to wirelessly transmit the signal.

2. The data storage device of claim 1, wherein the energy store comprises an energy harvesting component configured to produce the electrical energy from an ambient energy source.

3. The data storage device of claim 2, wherein the ambient energy source comprises one or more of a radio frequency energy source, a kinetic energy source or a thermal energy source.

4. The data storage device of claim 2, wherein the energy harvesting component comprises one or more solar cells, and the ambient energy source comprises a solar radiation source.

5. The data storage device of claim 1, wherein:
   the data port comprises a power port configured to receive power for the power interface from the host computer system as the power source, and
   the energy store is further configured to receive at least a portion of the electrical energy from the power interface via the data port.

6. The data storage device of claim 5, wherein, in response to the power port being electrically connected to the power source, the beacon component is configured to consume energy received from the host computer system to wirelessly transmit the signal.

7. The data storage device of claim 1, wherein the energy store comprises at least one capacitor for storing the stored energy.

8. The data storage device of claim 7, wherein the at least one capacitor comprises a plurality of capacitors forming a capacitor bank.

9. The data storage device of claim 1, wherein the signal comprises a unique identification code that uniquely identifies the data storage device.

10. The data storage device of claim 1, wherein the signal comprises information indicative of the state of the data storage device.

11. The data storage device of claim 1, wherein the beacon component is further configured to:
    determine an occurrence of a beacon trigger event; and
    in response to the occurrence of the beacon trigger event, wirelessly transmit the signal.

12. The data storage device of claim 11, wherein:
    the data storage device is configured to be associated with an associated user device;
    the beacon component is further configured to:
       receive a received signal transmitted by the associated user device;
       determine an indication of a signal strength of the received signal; and
       determine an indication of a proximity of the associated user device to the data storage device, based on the indication of the signal strength; and
    determining the occurrence of the beacon trigger event comprises determining that the indication of proximity exceeds an acceptable distance.

13. The data storage device of claim 1, wherein:
    the signal comprises a first signal; and
    the beacon component is further configured to wirelessly transmit a second signal at a beacon interval after the beacon component wirelessly transmitted the first signal.

14. The data storage device of claim 1, wherein:
    the beacon component is configured to wirelessly transmit one or more signals in accordance with a beacon configuration; and
    the beacon configuration defines at least one of a beacon interval, or a beacon transmission power.

15. The data storage device of claim 14, wherein the beacon component is further configured to adjust the beacon configuration based on at least one of:
    a motion of the data storage device;
    a time of the day;
    a current day or date;
    an indication of a proximity to an associated user device;
    a connection status of the data storage device to the host computer system;
    a power availability level associated with a power manager in the data storage device;
    a measure of the energy stored in the energy store;
    a measure of ambient light outside the data storage device;
    a measure of ambient temperature outside the data storage device;
    a last physical location of the data storage device;
    historical data of any of the above list; or a pattern detected in the historical data of any of the above list.

16. The data storage device of claim 1, wherein the beacon component is further configured to:
  receive a received signal; and
  in response to receiving the received signal, perform at least one of:
    wirelessly transmit a response signal;
    cause the data storage device to emit a visual signal; or
    cause the data storage device to emit an audible signal.

17. The data storage device of claim 1, wherein:
  the signal comprises a first signal;
  the beacon component is further configured to:
    wirelessly transmit the first signal in accordance with a first signal configuration; and
    wirelessly transmit a second signal in accordance with a second signal configuration; and
  the first signal configuration differs from the second signal configuration based on at least one of:
    a communication protocol;
    a transmission frequency; or
    a packet format.

18. The data storage device of claim 17, wherein the beacon component is further configured to:
  transition from a sleep mode to an awake mode; and
  in response to wirelessly transmitting the first signal and wirelessly transmitting the second signal, transition from the awake mode to the sleep mode.

19. A method for transmitting a beacon signal from a data storage device, comprising:
  disconnecting a power source from a power interface of the data storage device to enter a disconnected state, wherein the data storage device comprises:
    a non-volatile storage medium configured to store user data;
    a data port configured to transmit data between a host computer system and the data storage device;
    an energy store configured to store electrical energy; and
    a beacon component configured to wirelessly transmit a signal; and
  wirelessly transmitting the signal, wherein, responsive to the power interface being in a disconnected state:
    the beacon component is further configured to:
      selectively provide energy to the beacon component; and
      not provide energy for storing user data to the non-volatile storage medium; and
    wirelessly transmitting the signal consumes at least some of the electrical energy stored in the energy store.

20. A data storage device comprising:
a non-volatile storage medium configured to store user data;
means for transmitting data between a host computer system and the data storage device;
means for providing power to the data storage device responsive to connection to a power source;
means for storing electrical energy; and
means for wirelessly transmitting a signal, wherein, responsive to the means for providing power to the data storage device being in a disconnected state:
  the means for storing electrical energy is configured to:
    selectively provide energy to the means for wirelessly transmitting the signal; and
    not provide energy for storing user data to the non-volatile storage medium; and
  the means for wirelessly transmitting the signal consumes at least some of the electrical energy stored in the means for storing electrical energy.

* * * * *